US008747979B2

(12) United States Patent
Cavallin et al.

(10) Patent No.: US 8,747,979 B2
(45) Date of Patent: Jun. 10, 2014

(54) COATING COMPOSITIONS AND ARTICLES COATED THEREWITH

(75) Inventors: Carl Cavallin, Albertville, MN (US); T. Howard Killilea, North Oaks, MN (US); Larry Brandenburger, Lino Lakes, MN (US); Nhan Huynh, West Homestead, PA (US); Jeffrey Niederst, Leechburg, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 156 days.

(21) Appl. No.: 13/384,308

(22) PCT Filed: Jul. 16, 2010

(86) PCT No.: PCT/US2010/042254

§ 371 (c)(1),
(2), (4) Date: Feb. 22, 2012

(87) PCT Pub. No.: WO2011/009040

PCT Pub. Date: Jan. 20, 2011

(65) Prior Publication Data

US 2012/0145721 A1 Jun. 14, 2012

Related U.S. Application Data

(60) Provisional application No. 61/226,547, filed on Jul. 17, 2009, provisional application No. 61/243,888, filed on Sep. 18, 2009.

(51) Int. Cl.

| | |
|---|---|
| ***B29D 22/00*** | (2006.01) |
| ***B29D 23/00*** | (2006.01) |
| ***B32B 1/08*** | (2006.01) |

(52) U.S. Cl.

USPC ...... 428/36.91; 428/36.9; 428/36.6; 220/626; 413/1; 413/18

(58) Field of Classification Search

USPC .......... 428/36.9, 36.91, 36.6; 220/626; 413/1, 413/18

See application file for complete search history.

(56) References Cited

U.S. PATENT DOCUMENTS

| | | | |
|---|---|---|---|
| 2,633,458 | A | 3/1953 | Shokal |
| 3,242,123 | A | 3/1966 | Mayfield et al. |
| 3,377,406 | A | 4/1968 | Newey et al. |
| 3,390,206 | A | 6/1968 | Thompson et al. |
| 3,477,990 | A | 11/1969 | Dante et al. |
| 3,479,310 | A | 11/1969 | Deiterich et al. |
| 3,547,881 | A | 12/1970 | Mueller et al. |
| 3,547,885 | A | 12/1970 | Dante et al. |
| 3,694,407 | A | 9/1972 | Krikorian |
| 3,738,862 | A | 6/1973 | Klarquist et al. |
| 3,810,859 | A | 5/1974 | Mikofalvy |
| 3,862,914 | A | 1/1975 | Anderson et al. |
| 3,880,793 | A | 4/1975 | Nakayama |
| 3,933,706 | A | 1/1976 | Momiyama et al. |
| 3,943,187 | A | 3/1976 | Wu |
| 3,948,855 | A | 4/1976 | Perry |
| 3,969,300 | A | 7/1976 | Nagata et al. |
| 3,991,216 | A | 11/1976 | Christenson et al. |
| 3,997,694 | A | 12/1976 | Wu |
| 4,021,396 | A | 5/1977 | Wu |
| 4,028,294 | A | 6/1977 | Brown et al. |
| 4,033,920 | A | 7/1977 | Isozaki et al. |
| 4,048,141 | A | 9/1977 | Doorakian et al. |
| 4,064,087 | A | 12/1977 | Das |
| 4,076,676 | A | 2/1978 | Sommerfeld |
| 4,100,127 | A | 7/1978 | Fukusaki et al. |
| 4,122,052 | A | 10/1978 | Aihara et al. |
| 4,144,155 | A | 3/1979 | Araki et al. |
| 4,147,679 | A | 4/1979 | Scriven et al. |
| 4,151,143 | A | 4/1979 | Blank et al. |
| 4,212,776 | A | 7/1980 | Martinez et al. |
| 4,212,781 | A | 7/1980 | Evans et al. |
| 4,247,439 | A | 1/1981 | Matthews et al. |
| 4,247,659 | A | 1/1981 | Sekmakes et al. |
| 4,285,847 | A | 8/1981 | Ting |
| 4,289,674 | A | 9/1981 | Christenson et al. |
| 4,289,811 | A | 9/1981 | Shelley, Jr. |
| 4,294,737 | A | 10/1981 | Sekmakes et al. |
| 4,296,011 | A | 10/1981 | Sekmakes et al. |
| 4,303,488 | A | 12/1981 | Seiler et al. |
| 4,304,701 | A | 12/1981 | Das et al. |
| 4,305,859 | A | 12/1981 | McEwan et al. |
| 4,337,185 | A | 6/1982 | Wessling et al. |
| 4,370,446 | A | 1/1983 | Toyoda et al. |
| 4,404,336 | A | 9/1983 | Sekmakes et al. |

(Continued)

FOREIGN PATENT DOCUMENTS

| | | | |
|---|---|---|---|
| EP | 0807647 | A1 | 11/1997 |
| EP | 0964031 | A2 | 12/1999 |
| EP | 2042535 | A1 | 4/2009 |
| GB | 1513866 | | 6/1978 |
| GB | 2152065 | A | 7/1985 |
| JP | 5339387 | | 4/1978 |
| JP | 53097083 | | 8/1978 |
| JP | 543830 | | 2/1993 |
| JP | 5043830 | | 2/1993 |
| JP | 673308 | | 3/1994 |

(Continued)

OTHER PUBLICATIONS

21 C.F.R. §175.300 Resinous and Polymeric Coatings: Retrieved on Apr. 19, 2006. Retrieved from Internet: <URL: http://a257.g.akamaitech.net/7/257/2422/01apr20051500/edocket.access.gpo.gov/cfr_2005 . . . > (27 pages).

ASTM International, Designation: D 1200-94 (Reapproved 2005), Standard Test Method for Viscosity by Ford Viscosity Cup, Published Jun. 2005 (4 pages).

(Continued)

*Primary Examiner* — Michael C Miggins

(57) ABSTRACT

The present invention relates to a binder useful in coating end uses. The binder preferably includes an aqueous polymer dispersion and a vinyl polymer. The binder is useful in packaging coatings, including coatings for use on food or beverage cans, or a portion thereof.

23 Claims, No Drawings

(56) References Cited

U.S. PATENT DOCUMENTS

| | | | |
|---|---|---|---|
| 4,413,015 | A | 11/1983 | Anderson et al. |
| 4,423,165 | A | 12/1983 | Harper et al. |
| 4,425,451 | A | 1/1984 | Sekmakes et al. |
| 4,440,897 | A | 4/1984 | Maska |
| 4,442,246 | A | 4/1984 | Brown et al. |
| 4,443,568 | A | 4/1984 | Woo |
| 4,444,923 | A | 4/1984 | McCarty |
| 4,446,258 | A | 5/1984 | Chu et al. |
| 4,461,857 | A | 7/1984 | Sekmakes et al. |
| 4,476,262 | A | 10/1984 | Chu et al. |
| 4,477,609 | A | 10/1984 | Aluotto et al. |
| 4,480,058 | A | 10/1984 | Ting et al. |
| 4,482,673 | A | 11/1984 | Brown et al. |
| 4,487,861 | A | 12/1984 | Winner |
| 4,497,946 | A | 2/1985 | Sekmakes et al. |
| 4,501,831 | A | 2/1985 | Chu et al. |
| 4,507,425 | A | 3/1985 | Weaver |
| 4,522,961 | A | 6/1985 | Martino et al. |
| 4,539,348 | A | 9/1985 | Gajria et al. |
| 4,546,014 | A | 10/1985 | Gajria et al. |
| 4,560,714 | A | 12/1985 | Gajria et al. |
| 4,572,610 | A | 2/1986 | Krajewski |
| 4,579,888 | A | 4/1986 | Kodama et al. |
| 4,585,814 | A | 4/1986 | Sekmakes et al. |
| 4,600,737 | A | 7/1986 | Georgalas et al. |
| 4,623,680 | A | 11/1986 | Azarnia et al. |
| 4,629,491 | A | 12/1986 | Swerdloff et al. |
| 4,638,020 | A | 1/1987 | Christenson et al. |
| 4,644,030 | A | 2/1987 | Loewrigkeit et al. |
| 4,647,612 | A | 3/1987 | Ranka et al. |
| 4,683,273 | A | 7/1987 | Bode |
| 4,692,491 | A | 9/1987 | Ranka et al. |
| 4,703,071 | A | 10/1987 | Owens |
| 4,741,961 | A | 5/1988 | Frisch et al. |
| 4,871,810 | A | 10/1989 | Saltman |
| 4,898,911 | A | 2/1990 | Miyashita et al. |
| 4,943,359 | A | 7/1990 | Patzschke et al. |
| 4,946,911 | A | 8/1990 | Treybig |
| 4,948,834 | A | 8/1990 | Baker et al. |
| 4,963,602 | A | 10/1990 | Patel |
| 4,997,865 | A | 3/1991 | Scherping et al. |
| 5,043,380 | A | 8/1991 | Cole |
| 5,051,470 | A | 9/1991 | Woo et al. |
| 5,068,266 | A | 11/1991 | Kojima et al. |
| 5,082,842 | A | 1/1992 | Widmer |
| 5,093,392 | A | 3/1992 | Woo et al. |
| 5,096,992 | A | 3/1992 | Ross et al. |
| 5,116,888 | A | 5/1992 | Woo et al. |
| 5,157,078 | A | 10/1992 | Woo et al. |
| 5,166,289 | A | 11/1992 | Yezrielev et al. |
| 5,173,526 | A | 12/1992 | Vijayendran et al. |
| 5,177,129 | A | 1/1993 | Bobo, Jr. |
| 5,196,481 | A | 3/1993 | Owens et al. |
| 5,201,436 | A | 4/1993 | Owens et al. |
| 5,212,241 | A | 5/1993 | Woo et al. |
| 5,252,637 | A | 10/1993 | Craun et al. |
| 5,252,669 | A | 10/1993 | Maska et al. |
| 5,264,469 | A | 11/1993 | Mysliwczyk et al. |
| 5,270,356 | A | 12/1993 | Katamoto et al. |
| 5,290,828 | A | 3/1994 | Craun et al. |
| 5,296,525 | A | 3/1994 | Spencer |
| 5,342,864 | A | 8/1994 | Craun et al. |
| 5,344,858 | A | 9/1994 | Hart et al. |
| 5,387,625 | A | 2/1995 | Parekh et al. |
| 5,428,084 | A | 6/1995 | Swarup et al. |
| 5,464,885 | A | 11/1995 | Craun |
| 5,500,463 | A | 3/1996 | Nishimura et al. |
| 5,504,145 | A | 4/1996 | Treasurer |
| 5,508,325 | A | 4/1996 | Craun et al. |
| 5,527,840 | A | 6/1996 | Chutko et al. |
| 5,532,297 | A | 7/1996 | Woo et al. |
| 5,554,671 | A | 9/1996 | Craun et al. |
| 5,576,063 | A | 11/1996 | Briggs et al. |
| 5,576,361 | A | 11/1996 | Craun |
| 5,672,653 | A | 9/1997 | Frisch et al. |
| 5,686,511 | A | 11/1997 | Bobo |
| 5,714,539 | A | 2/1998 | Perez et al. |
| 5,723,555 | A | 3/1998 | Swarup et al. |
| 5,733,970 | A | 3/1998 | Craun |
| 5,739,215 | A | 4/1998 | Westerhof et al. |
| 5,767,175 | A | 6/1998 | Kamekura et al. |
| 5,780,532 | A | 7/1998 | Noda et al. |
| 5,792,804 | A | 8/1998 | Cibura et al. |
| 5,830,952 | A | 11/1998 | Pedersen et al. |
| 5,840,384 | A | 11/1998 | Noda et al. |
| 5,869,552 | A | 2/1999 | Pedersen et al. |
| 5,869,568 | A | 2/1999 | Maeda |
| 5,877,239 | A | 3/1999 | Craun et al. |
| 5,898,049 | A | 4/1999 | Müller et al. |
| 5,907,012 | A | 5/1999 | Voss et al. |
| 5,922,817 | A | 7/1999 | Pedersen et al. |
| 5,939,482 | A | 8/1999 | Kriessmann et al. |
| 5,942,563 | A | 8/1999 | DeGraaf |
| 5,962,620 | A | 10/1999 | Reich et al. |
| 5,972,432 | A | 10/1999 | Chutko et al. |
| 5,976,615 | A | 11/1999 | Menovcik et al. |
| 5,976,700 | A | 11/1999 | Chutko et al. |
| 5,993,972 | A | 11/1999 | Reich et al. |
| 6,008,273 | A | 12/1999 | Leibelt et al. |
| 6,040,062 | A | 3/2000 | McGee et al. |
| 6,046,256 | A | 4/2000 | Nakamura et al. |
| 6,048,924 | A | 4/2000 | Obayashi et al. |
| 6,083,585 | A | 7/2000 | Cahill et al. |
| 6,087,417 | A | 7/2000 | Stevenson et al. |
| 6,126,999 | A | 10/2000 | Tomasino et al. |
| 6,136,927 | A | 10/2000 | Swarup et al. |
| 6,262,217 | B1 | 7/2001 | Tallmadge et al. |
| 6,300,428 | B1 | 10/2001 | Stevenson et al. |
| 6,306,934 | B1 | 10/2001 | Bode et al. |
| 6,339,125 | B1 | 1/2002 | Bechara et al. |
| 6,346,307 | B1 | 2/2002 | Al Ghatta et al. |
| 6,359,062 | B1 | 3/2002 | Mallen |
| 6,429,254 | B2 | 8/2002 | Schafheutle et al. |
| 6,465,559 | B1 | 10/2002 | Bechara et al. |
| 6,514,619 | B2 | 2/2003 | Shimada et al. |
| 6,576,689 | B2 | 6/2003 | Noda et al. |
| 6,627,316 | B1 | 9/2003 | Matsuki et al. |
| 6,831,136 | B2 | 12/2004 | Chao et al. |
| 7,189,787 | B2 | 3/2007 | O'Brien et al. |
| 7,375,174 | B2 | 5/2008 | Ramesh et al. |
| 7,459,167 | B1 | 12/2008 | Sengupta et al. |
| 7,479,519 | B2 | 1/2009 | Krishnan |
| 7,534,830 | B2 | 5/2009 | Williams |
| 7,592,047 | B2 | 9/2009 | O'Brien et al. |
| 7,858,162 | B2 | 12/2010 | Fuhry et al. |
| 8,092,876 | B2 | 1/2012 | O'Brien et al. |
| 8,142,868 | B2 | 3/2012 | O'Brien et al. |
| 8,173,265 | B2 | 5/2012 | O'Brien et al. |
| 2002/0155235 | A1 | 10/2002 | Taylor et al. |
| 2003/0069380 | A1 | 4/2003 | Flat et al. |
| 2004/0167252 | A1 | 8/2004 | Melchiors et al. |
| 2005/0084686 | A1 | 4/2005 | Imaizumi |
| 2005/0182155 | A1 | 8/2005 | O'Dell et al. |
| 2005/0192400 | A1 | 9/2005 | Killilea et al. |
| 2007/0027249 | A1 | 2/2007 | Killilea |
| 2007/0031679 | A1 | 2/2007 | Ushida et al. |
| 2008/0009601 | A1 | 1/2008 | Killilea et al. |
| 2008/0166485 | A1 | 7/2008 | Steenwinkel et al. |
| 2010/0282248 | A1 | 11/2010 | Schutte et al. |
| 2011/0288232 | A1 | 11/2011 | Rademacher et al. |
| 2012/0171470 | A1 | 7/2012 | Cavallin et al. |
| 2013/0064938 | A1 | 3/2013 | O'Brien et al. |
| 2013/0196037 | A1 | 8/2013 | O'Brien et al. |

FOREIGN PATENT DOCUMENTS

| | | |
|---|---|---|
| JP | 10158528 | 3/1994 |
| JP | 10139839 | 5/1998 |
| JP | 2002138245 | 5/2002 |
| JP | 2002155234 | 5/2002 |
| JP | 2006077049 | 3/2003 |
| JP | 2003321646 | 11/2003 |
| JP | 2004026913 | 1/2004 |
| JP | 2005089716 | 4/2005 |

(56) References Cited

FOREIGN PATENT DOCUMENTS

| | | | |
|---|---|---|---|
| JP | 2005179491 | | 7/2005 |
| JP | 2007238698 | | 9/2007 |
| JP | 2008297379 | | 12/2008 |
| WO | 9308154 | A1 | 4/1993 |
| WO | 0192366 | A1 | 12/2001 |
| WO | 02064691 | A2 | 8/2002 |
| WO | 03076530 | A2 | 9/2003 |
| WO | 2004055086 | A1 | 7/2004 |
| WO | 2004090020 | A1 | 10/2004 |
| WO | 2006045017 | A1 | 4/2006 |
| WO | 2007066816 | A1 | 6/2007 |
| WO | 2010062928 | A1 | 6/2010 |
| WO | 2010066902 | A1 | 6/2010 |
| WO | 2010097353 | | 9/2010 |
| WO | 2010118356 | A1 | 10/2010 |

OTHER PUBLICATIONS

ASTM International, Designation: D 2196-05, Standard Test Methods for Rheological Properties of Non-Newtonian Materials by Rotational (Brookfield type) Viscometer, Published Aug. 2005 (5 pages).

ASTM International, Designation: D 3359-02, Standard Test Methods for Measuring Adhesion by Tape Test, Published Oct. 2002 (7 pages).

ASTM International, Designation: D 5402-93 (Reapproved 1999), Standard Practice for Assessing the Solvent Resistance of Organic Coatings Using Solvent Rubs, Published Jul. 1993 (3 pages).

Chattopadhyay, et al., "Effect of Chain Extender on Phase Mixing and Coating Properties of Polyurethane Ureas," Ind. Eng. Chem. Res., 2005, vol. 44, P. 1772-1779 (8 pages).

International Search Report and Written Opinion for PCT/US2010/042254 mailed on Dec. 7, 2010 (11 pages).

Guidelines for Industry, "Preparation of Food Contact Notifications and Food Additive Petitions for Food Contact Substances: Chemistry Recommendations," Center for Food Safety and Applied Nutrition, Apr. 2002, Retrieved on Apr. 19, 2006. Retrieved from Internet: <URL: http://www.cfsan.fda.gov/~dms/opa2pmnc.html> (37 pages).

Niangui, et al., "Synthesis of Glycidyl Methacrylate," Thermosetting Resin, Jan. 2002, vol. 17, No. 1, p. 27-28, (2 pages) [English-language abstract at p. 28].

Szycher, et al., "Development of an Aliphatic Biomedical-Grade Polyurethane Elastomer," Journal of Elastomers and Plastics, 1983, vol. 15, p. 81-95 (16 pages).

Exhibit 21: Declaration of Shanti Swarup submitted in U.S. Inter Partes Re-exam 95/001,951.

COATING COMPOSITIONS AND ARTICLES COATED THEREWITH

CROSS REFERENCE TO RELATED APPLICATION

This application is the National Stage filing under 35 U.S.C. 371 of International Application No. PCT/US2010/042254 filed Jul. 16, 2010 and entitled "COATING COMPOSITION AND ARTICLES COATED THEREWITH," which claims the benefit of U.S. Provisional Application Ser. No. 61/226,547 filed Jul. 17, 2009 and entitled "COATING COMPOSITIONS FOR CANS AND METHODS OF COATING" and U.S. Provisional Application Ser. No. 61/243,888 filed Sep. 18, 2009 and entitled "COATING COMPOSITION AND ARTICLES COATED THEREWITH," the disclosures of which are incorporated herein in their entirety.

FIELD OF INVENTION

The present invention relates to a coating composition useful for coating a variety of substrates, including packaging articles.

BACKGROUND

A wide variety of coatings have been used to coat the surfaces of packaging articles (e.g., food and beverage cans). For example, metal cans are sometimes coated using "coil coating" or "sheet coating" operations, i.e., a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed article and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, and resist degradation over long periods of time, even when exposed to harsh environments.

Various coatings have been used as interior protective can coatings, including epoxy-based coatings and polyvinyl-chloride-based coatings. Each of these coating types, however, has potential shortcomings. For example, the recycling of materials containing polyvinyl chloride or related halide-containing vinyl polymers can be problematic. There is also a desire by some to reduce or eliminate certain epoxy compounds commonly used to formulate food-contact epoxy coatings.

What is needed in the marketplace is an improved binder system for use in coatings such as, for example, packaging coatings.

SUMMARY

The invention provides a coating composition for use with a variety of articles, including metal packaging articles such as food or beverage cans. In preferred embodiments, the coating composition includes an aqueous dispersion that includes (i) a water-dispersible polymer such as, e.g., a polyurethane polymer, a polyester polymer, an alkyd polymer, an acrylic polymer, or a mixture or copolymer thereof and (ii) a vinyl polymer. For sake of convenience, the water-dispersible polymer and the vinyl polymer are referred to collectively herein as a "binder." In certain preferred embodiments, the vinyl polymer is formed in the presence of an aqueous dispersion of the water-dispersible polymer, more preferably the vinyl polymer is emulsion polymerized in the presence of the aqueous dispersion. In some embodiments, the vinyl polymer has a number average molecular weight of at least 100,000, more preferably at least 200,000, and even more preferably at least 300,000.

The water-dispersible polymer (preferably a polyurethane) and the vinyl polymer may be present in the same and/or different particles of an aqueous dispersion. The water-dispersible polymer and the vinyl polymer can be present as separate polymers (i.e., polymers that are not covalently attached to one another), covalently attached polymers, or a mixture thereof. Optional covalent linkages may be formed between the water-dispersible polymer and the vinyl polymer at any suitable time, including prior to cure (e.g., during formation of the vinyl polymer), during and/or after cure of a coating composition including the binder, or a combination thereof. In some embodiments, the water-dispersible polymer and the vinyl polymer are not covalently attached while present in one or both of a liquid coating composition or a cured coating resulting therefrom.

In preferred embodiments, the coating composition includes both a polyurethane polymer and a vinyl polymer. The polyurethane polymer may be a polyurethane-urea polymer, which preferably has a plurality of urethane and urea linkages. Preferably at least some of the urea and urethane linkages are located in a backbone of the polymer.

In some embodiments, the water-dispersible polymer includes one or more optional aliphatic carbon-carbon double bonds. In one such embodiment, the polymer (preferably a polyurethane) includes one or more (poly)alkene groups, and more preferably one or more backbone (poly)alkene segments.

The invention also provides a method for making a binder, as well as a method for making a coating composition including the binder. In one embodiment, the invention provides a method for making a binder that includes the steps of providing an aqueous dispersion of a polyurethane-urea polymer, more preferably a polyurethane-urea salt, and forming a vinyl polymer in the presence of the aqueous dispersion of the polyurethane-urea polymer. In one embodiment, the vinyl polymer is batch polymerized in the presence of the polyurethane polymer.

The invention also provides articles having the coating composition of the invention disposed on at least a portion thereof (e.g., as a primer coat, an intermediate coat, and/or a topcoat). In some embodiments, the coated article is a food or beverage can or a portion thereof. The coating composition of the invention may be applied on any surface of the food or beverage can, including a food-contact surface. The coating composition may be applied on a substrate (typically a metal substrate) either prior to or after forming the substrate, e.g., into a can or a portion thereof.

DEFINITIONS

The term "substantially free" of a particular mobile compound means that the compositions of the present invention contain less than 1000 parts per million (ppm) of the recited mobile compound. The term "essentially free" of a particular mobile compound means that the compositions of the present invention contain less than 100 parts per million (ppm) of the recited mobile compound. The term "essentially completely free" of a particular mobile compound means that the compositions of the present invention contain less than 5 parts per million (ppm) of the recited mobile compound. The term "completely free" of a particular mobile compound means that the compositions of the present invention contain less than 20 parts per billion (ppb) of the recited mobile compound.

The term "mobile" means that the compound can be extracted from the cured coating when a coating (typically ~4 $mg/cm^2$ (6.5 $mg/in^2$) thick) is exposed to a test medium for some defined set of conditions, depending on the end use. An example of these testing conditions is exposure of the cured coating to HPLC-grade acetonitrile for 24 hours at 25° C.

If the aforementioned phrases are used without the term "mobile" (e.g., "substantially free of XYZ compound") then the compositions of the present invention contain less than the aforementioned amount of the compound whether the compound is mobile in the coating or bound to a constituent of the coating.

A group that may be the same or different is referred to as being "independently" something.

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that encompasses the moiety.

The term "aliphatic" when used in the context of a carbon-carbon double bond includes both linear aliphatic and cycloaliphatic carbon-carbon double bonds, but excludes carbon-carbon double bonds of aromatic rings.

The term "unsaturation" when used in the context of a compound refers to a compound that includes at least one non-aromatic (e.g., aliphatic) double or triple bond.

The term "vinyl polymer" refers to a polymer prepared by addition polymerizing an ethylenically unsaturated component (e.g., a mixture of ethylenically unsaturated monomers and/or oligomers).

The term "(meth)acrylate" includes both acrylates and methacrylates.

The term "polymer" includes both homopolymers and copolymers (i.e., polymers of two or more different monomers).

The term "dispersion" in the context of a dispersible polymer refers to the mixture of a dispersible polymer and a carrier. The term "dispersion" is intended to include the term "solution."

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

The term "food-contact surface" refers to a surface of an article (e.g., a food or beverage container) that is in contact with, or suitable for contact with a food or beverage product.

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "a" polymer can be interpreted to mean that the coating composition includes "one or more" polymers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

This invention provides a coating composition for use on a variety of surfaces, including surfaces of metal articles. The coating composition is particularly useful as a coating for metal packaging articles, including food and beverage cans. The coating composition includes a binder, preferably in a film-forming amount. The binder preferably includes (i) a water-dispersible polymer such as, for example, a water-dispersible polyurethane polymer and (ii) a vinyl polymer.

The coating composition can be applied to a metal substrate either before or after the substrate is formed into an article (e.g., a food or beverage can) or a portion thereof. Preferred coating compositions of the invention are suitable for use in food-contact situations and may be used on the inside of food or beverage cans.

The binder may be formed using any suitable process. In one embodiment, the binder is prepared by polymerizing an ethylenically unsaturated component in the presence of an aqueous dispersion of a water-dispersible polymer. The ethylenically unsaturated component is preferably a mixture of one or more monomers and/or oligomers. Preferably, at least one of the monomers and/or oligomers in the mixture is an alpha, beta-ethylenically unsaturated monomer. The binder may also be prepared using any other suitable method, including, for example, by combining an aqueous polymer dispersion, more preferably a polyurethane dispersion, and a vinyl polymer. It is also contemplated that the binder may be formed by either (i) polymerizing the water-dispersible polymer in the presence of the vinyl polymer or (ii) simultaneously polymerizing both the water-dispersible polymer and the ethylenically unsaturated component. For the above methods (i) or (ii), it is contemplated that the water-dispersible polymer may be rendered water dispersible in a post-polymerization step, if desired.

The water-dispersible polymer can be any suitable polymer, including, for example, a polyurethane polymer, a polyester polymer, an alkyd polymer, an acrylic polymer, or any copolymer or combination of the foregoing. Polyurethane polymers are presently preferred for certain end uses (e.g., beverage end coatings) due to the excellent fabrication properties observed for certain binders of the invention that include a water-dispersible polyurethane polymer. In some embodiments, water-dispersible polyurethane-urea polymers are preferred. For purposes of convenience, the water-dispersible polymer of the aqueous dispersion will hereinafter be discussed primarily in the context of a polyurethane polymer. It should be understood, however, that the below teachings are generally applicable to water-dispersible polymers other than polyurethanes. As such, any suitable water-dispersible polymer such as, e.g., a water-dispersible acrylic, polyester, or alkyd may be substituted for the water-dispersible polyurethane in the below described binders and coating compositions. For further discussion of suitable such polymers see U.S. 2006/0100366 and U.S. application Ser. No. 12/505,255 filed on Jul. 17, 2009 and entitled "COATING COMPOSITIONS FOR CANS AND METHODS OF COATING," each of which is incorporated herein by reference.

The polyurethane polymer (which in certain embodiments is a polyurethane-urea polymer) and the vinyl polymer of preferred binders of the invention may be present in a variety of different configurations. For example, the polyurethane polymer and the vinyl polymer may be present in (i) different particles of an aqueous dispersion (e.g., a polyurethane-containing particle and a separate vinyl-containing polymer) and/or (ii) a particle containing both the polyurethane polymer and the vinyl polymer. If present in the same particle of an aqueous dispersion, the vinyl polymer and the polyurethane polymer may, or may not, be covalently attached to one another while present in the aqueous dispersion, depending upon the embodiment. In certain embodiments, covalent linkages may be formed between the polyurethane polymer and the vinyl polymer during and/or after cure of the aqueous coating compositions, regardless of whether the polyurethane and vinyl polymers are present in the same or different particles of the aqueous dispersion.

In some embodiments, the water-dispersible polymer (e.g., water-dispersible polyurethane polymer) supports formation of an aqueous dispersion (e.g., a latex) including the vinyl polymer stably dispersed therein. While not intending to be bound by any theory, it is believed that in certain embodiments the water-dispersible polymer functions as a polymeric surfactant to support stable dispersion of the vinyl polymer in an aqueous carrier.

The polyurethane polymers can be made water-dispersible using any suitable means, including the use of water-dispersing groups such as non-ionic water-dispersing groups, salt groups (e.g., anionic and/or cationic salt groups), or a combination thereof. Alternatively, a surfactant may be used to render the polyurethane polymer water dispersible. As used herein, the term "water-dispersing groups" also encompasses water-solubilizing groups.

In one embodiment, the coating composition is prepared by: forming and/or providing a water-dispersible polyurethane polymer, dispersing the polyurethane polymer in a carrier that includes water and an optional organic solvent to form an aqueous dispersion, combining an ethylenically unsaturated component with the aqueous dispersion (preferably, the ethylenically unsaturated component is added to the aqueous dispersion), and polymerizing the ethylenically unsaturated component in the presence of the aqueous dispersion to form the binder.

Preferred compositions are substantially free of mobile bisphenol A (BPA) and aromatic glycidyl ether compounds (e.g., BADGE, BFDGE, and epoxy novalacs), more preferably essentially free of these compounds, even more preferably essentially completely free of these compounds, and most preferably completely free of these compounds. The coating composition (and, hence, the binder) is also preferably substantially free of bound BPA and aromatic glycidyl ether compounds, more preferably essentially free of these compounds, most preferably essentially completely free of these compounds, and optimally completely free of these compounds.

Preferred binders are at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments. The coating composition of the invention is also preferably at least substantially epoxy-free, more preferably epoxy-free.

In preferred embodiments, the binder is "PVC-free," and preferably the coating composition is also "PVC-free." That is, each composition preferably contains less than 2 weight percent ("wt-%") of vinyl chloride materials, more preferably less than 0.5 wt-% of vinyl chloride materials, and even more preferably less than 1 part-per-million of vinyl chloride materials.

In preferred embodiments, the number average molecular weight ("Mn") of the water-dispersible polyurethane polymer is no greater than 50,000, preferably no greater than 45,000, and even more preferably no greater than 40,000. Preferably, the Mn of the water-dispersible polyurethane polymer is at least 5,000, more preferably at least 10,000, and even more preferably at least 30,000.

In preferred embodiments, the water-dispersible polyurethane polymer contains a suitable amount of water-dispersing groups, preferably salt and/or salt-forming groups, to form a stable aqueous dispersion with an aqueous carrier. Non-limiting examples of suitable salt-forming groups include neutralizable groups (e.g., acidic or basic groups). Non-limiting examples of suitable salt groups include anionic salt groups, cationic salt groups, or combinations thereof. As previously discussed, the polymer can contain non-ionic water-dispersing groups in addition to, or in place of, salt or salt-forming groups.

The polyurethane polymer is typically dispersed using salt groups. A salt (which can be a full salt or partial salt) is typically formed by neutralizing or partially neutralizing salt-forming groups of the polyurethane polymer with a suitable neutralizing agent. Alternatively, the polyurethane polymer may be formed from ingredients including preformed salt groups. The degree of neutralization required to form the desired polymer salt may vary considerably depending upon the amount of salt-forming groups included in the polymer, and the degree of solubility or dispersibility of the salt which is desired. Ordinarily in making the polymer water dispersible, the salt-forming groups (e.g., acid or base groups) of the polymer are at least 25% neutralized, preferably at least 30% neutralized, and more preferably at least 35% neutralized, with a neutralizing agent in water.

Non-limiting examples of anionic salt groups include neutralized acid or anhydride groups, sulphate groups ($-OSO_3^-$), phosphate groups ($-OPO_3^-$), sulfonate groups ($—SO_2O^-$), phosphinate groups ($—POO^-$), phosphonate groups ($—PO_3^-$), and combinations thereof. Non-limiting examples of suitable cationic salt groups include:

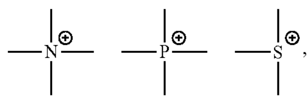

(referred to, respectively, as quaternary ammonium groups, quaternary phosphonium groups, and tertiary sulfate groups) and combinations thereof. Non-limiting examples of non-ionic water-dispersing groups include hydrophilic groups such as ethylene oxide groups. Compounds for introducing the aforementioned groups into polymers are known in the art.

Non-limiting examples of neutralizing agents for forming anionic salt groups include inorganic and organic bases such as an amine, sodium hydroxide, potassium hydroxide, lithium hydroxide, ammonia, and mixtures thereof. In certain embodiments, tertiary amines are preferred neutralizing agents. Non-limiting examples of suitable tertiary amines include trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Triethyl amine or dimethyl ethanol amine are preferred tertiary amines.

Non-limiting examples of neutralizing agents for forming cationic salt groups include organic and inorganic acids such as formic acid, acetic acid, hydrochloric acid, sulfuric acid, and combinations thereof.

When acid or anhydride groups are used to impart water-dispersibility, the acid- or anhydride-functional polymer preferably has an acid number of at least 5, and more preferably at least 40 milligrams (mg) KOH per gram resin. The acid-functional polymer preferably has an acid number of no greater than 400, and more preferably no greater than 100 mg KOH per gram resin.

Alternatively, a surfactant may be used in place of water-dispersing groups to aid in dispersing the polyurethane in an aqueous carrier. Non-limiting examples of suitable surfactants compatible with food or beverage packaging applications include alkyl sulfates (e.g., sodium lauryl sulfate), ether sulfates, phosphate esters, sulphonates, and their various alkali, ammonium, amine salts and aliphatic alcohol ethoxylates, alkyl phenol ethoxylates, and mixtures thereof.

The amount of the water-dispersible polyurethane polymer present in the binder is preferably at least 5 wt-%, more preferably at least 20 wt-%, even more preferably at least 30 wt-%, and optimally at least 35 wt-%. The amount of the water-dispersible polyurethane polymer present in the binder is preferably no greater than 95 wt-%, preferably no greater than 85 wt-%, even more preferably no greater than 70 wt-%, and optimally no greater than 55 wt-%. These percentages are based on total amount of vinyl polymer and polyurethane polymer.

The polyurethane polymer preferably includes a sufficient number of urethane linkages to provide the desired coating properties for the desired end use. Such coating properties may include flexibility, abrasion resistance, and/or fabrication (e.g., to accommodate the rivet and other contours of a beverage can end without unsuitably cracking or ripping). Preferred polyurethane polymers preferably include on average at least about 2 urethane linkages, more preferably at least 10 urethane linkages, and even more preferably at least 20 urethane linkages per molecule of the polyurethane polymer. While the number of urethane linkages present in the polyurethane polymer is not particularly restricted on the high end and may vary depending upon molecular weight, in certain embodiments, the polyurethane polymer includes on average less than 1,000 urethane linkages, less than 200 urethane linkages, or less than 50 urethane linkages per molecule of the polyurethane polymer.

Isocyanate content may be another useful measure of urethane linkage content. In presently preferred embodiments, the polyurethane polymer is formed from at least about 0.1 wt-%, more preferably at least about 1 wt-%, and even more preferably at least 5 wt-% of an isocyanate compound. Preferably, the polyurethane polymer is formed from less than about 25 wt-%, more preferably less than about 20 wt-%, and even more preferably less than about 15 wt-% of an isocyanate compound. Preferably, the isocyanate compound is incorporated into a backbone of the polyurethane polymer via a urethane linkage, and more preferably a pair of urethane linkages.

The polyurethane polymer may include a backbone of any suitable structural configuration. The backbone can have different structural configurations depending on a variety of factors such as the materials used to form the backbone, cost, and the desired end use for the polymer. The backbone may optionally include one or more other backbone linkages such as, for example, amide, ester, carbonate ester, epoxy, ether, imide, imine, or urea linkages, or a combination thereof. Moreover, the backbone of the polyurethane polymer may optionally include one or more oligomer or polymer segments selected from, for example, acrylic, polyamide, polyester, poly(carbonate ester), epoxy, polyether, polyimide, polyimine, or polyurea segments, or a combination thereof.

In certain preferred embodiments, the backbone is a polyurethane-urea backbone. The polyurethane polymer may include any suitable number of optional urea linkages. Preferably at least some of the urea linkages are located in a backbone of the polyurethane polymer. In some embodiments, the polyurethane polymer includes on average at least about 1 urea linkage, more preferably at least 5 urea linkages, and even more preferably at least 10 urea linkages per molecule of the polyurethane polymer. While the number of urea linkages present in the polyurethane polymer is not particularly restricted on the high end and may vary depending upon molecular weight, in certain embodiments, the polyurethane polymer includes on average less than 1,000 urea linkages, less than 200 urea linkages, or less than 20 urea linkages per molecule of the polyurethane polymer.

In some embodiments, the polyurethane polymer is a linear, or substantially linear, polymer. In other embodiments, the polyurethane polymer may include branching.

The polyurethane polymer of the invention may be formed using any suitable reactants and any suitable process. The polyurethane polymer is typically formed by reacting ingredients that include one or more isocyanate-functional compounds, one or more polyols, and optionally one or more additional reactants (e.g., organic materials having one or more active hydrogen groups).

A variety of isocyanate compounds may be used to form the polyurethane polymer. In some embodiments, the isocyanates are incorporated into the polyurethane polymer exclusively through urethane linkages. In other embodiments, at least some of the isocyanate compound may be incorporated into the backbone of the polyurethane polymer via one or more non-urethane (e.g., urea) linkages formed through a reaction involving an isocyanate group (—NCO) of the isocyanate compound.

The isocyanate compound may be any suitable compound, including an isocyanate compound having 1 isocyanate group; a polyisocyanate having 2 isocyanate groups, 3 isocyanate groups, or 4 or more isocyanate groups; or a mixture thereof. Suitable diisocyanates may include isophorone diisocyanate (i.e., 5-isocyanato-1-isocyanatomethyl-1,3,3-trimethylcyclohexane); 5-isocyanato-1-(2-isocyanatoeth-1-yl)-1,3,3-trimethylcyclohexane; 5-isocyanato-1-(3-isocyanatoprop-1-yl)-1,3,3-trimethylcyclohexane; 5-isocyanato-(4-isocyanatobut-1-yl)-1,3,3-trimethylcyclohexane; 1-isocyanato-2-(3-isocyanatoprop-1-yl)cyclohexane; 1-isocyanato-2-(3-isocyanatoeth-1-yl)cyclohexane; 1-isocyanato-2-(4-isocy-anatobut-1-yl)cyclohexane; 1,2-diisocyanatocyclobutane; 1,3-diisocyanatocyclobutane; 1,2-diisocyanatocyclopentane; 1,3-diisocyanatocyclopentane; 1,2-diisocyanatocyclohexane; 1,3-diisocyanatocyclohexane; 1,4-diisocyanatocyclohexane; dicyclohexylmethane 2,4'-diisocyanate; trimethylene diisocyanate; tetramethylene diisocyanate; pentamethylene diisocyanate; hexamethylene diisocyanate; ethylethylene diisocyanate; trimethylhexane diisocyanate; heptamethylene diisocyanate; 2-heptyl-3,4-bis(9-isocyanatononyl)-1-pentyl-cyclohexane; 1,2-, 1,4-, and 1,3-bis(isocyanatomethyl)cyclohexane; 1,2-, 1,4-, and 1,3-bis(2-isocyanatoeth-1-yl)cyclohexane; 1,3-bis(3-isocyanatoprop-1-yl)cyclohexane; 1,2-, 1,4- or 1,3-bis(4-isocyanatobuty-1-yl)cyclohexane; liquid bis(4-isocyanatocyclohexyl)-methane; and derivatives or mixtures thereof.

In some embodiments, the isocyanate compounds are preferably non-aromatic (e.g., aliphatic). Non-aromatic isocyanates are particularly desirable for coating compositions intended for use on an interior surface of a food or beverage can. Isophorone diisocyanate (IPDI) and hexamethylene isocyanate (HMDI) are preferred non-aromatic isocyanates. In certain preferred embodiments, the polyurethane polymer does not include any structural units derived from aromatic isocyanate compounds.

In some embodiments, at least some, or alternatively all, of the isocyanate compounds may be a partially blocked polyisocyanate. Certain embodiments may benefit from the inclusion of blocked isocyanate groups in the polyurethane polymer as a means for forming covalent linkages with other components of the coating composition, including, for example, the polyurethane polymer itself or a crosslinking agent. Preferred partially blocked polyisocyanates contain, on average, at least about 1.5, more preferably at least about 1.8, and even more preferably at least about 2 free (or unblocked) isocyanate groups per molecule of partially blocked polyisocyanate. Suitable partially blocked polyisocyanates preferably contain on average less than about 3, more preferably less than about 2.5, and even more preferably less than about 2.2 free isocyanate groups per molecule of partially blocked polyisocyanate. Preferred partially blocked polyisocyanates contain, on average, at least about 0.5, more preferably at least about 0.7, and even more preferably at least about 1 blocked isocyanate groups per molecule of partially blocked polyisocyanate. The blocked isocyanate groups of the at least partially blocked polyisocyanate can be any suitable combination of deblockable and/or non-deblockable isocyanate groups. In some embodiments, all or substantially all of the blocked isocyanate groups are deblockable.

An example of a deblockable isocyanate group is a blocked isocyanate group where the blocking group, when exposed to suitable film-curing conditions, can either (i) disassociate to liberate a free (i.e., unblocked) isocyanate group or (ii) be readily displaced or replaced by another group or component. Deblockable isocyanate groups are preferably capable of deblocking under film-curing conditions so that a covalent linkage can be formed during cure via reaction of the deblocked isocyanate group with another group (e.g., an isocyanate-reactive group such as a hydroxyl group). The other group may be present on the polyurethane polymer, the vinyl polymer, an optional crosslinker, or another optional compound. Preferably, at least a substantial portion, and more preferably a majority, of the deblockable isocyanate groups are capable of de-blocking during exposure to suitable film-curing conditions. For example, a substantial portion (more preferably at least a majority) of the deblockable isocyanate groups preferably unblock when a metal substrate coated with a coating composition containing the binder is either (a) heated in a 190° C. oven for about 20 minutes or (b) heated in a 230° C. oven for about 10 seconds. Preferred deblockable isocyanate groups do not readily unblock during prolonged storage at room temperature, more preferably do not readily unblock at a temperature of less than about 50° C., and even more preferably do not readily unblock at a temperature of less than about 100° C.

In some embodiments, the partially blocked polyisocyanate is a trimer compound having two free isocyanate groups and one blocked isocyanate group, more preferably one deblockable isocyanate group. In one such embodiment, the polyisocyanate compound is a trifunctional "trimer" that is a trimerization product prepared from on average three diisocyanate molecules. In another embodiment, the polyisocyanate compound is a trimer prepared from on average three moles of diisocyanate (e.g., HMDI) reacted with one mole of another compound such as, for example, a triol (e.g., trimethylolpropane).

Non-limiting examples of suitable blocking agents include malonates, such as ethyl malonate and diisopropyl malonate; acetylacetone; ethyl acetoacetate; 1-phenyl-3-methyl-5-pyrazolone; pyrazole; 3-methylpyrazole; 3,5dimethyl pyrazole; hydroxylamine; thiophenol; caprolactam; pyrocatechol; propyl mercaptan; N-methyl aniline; amines such as diphenyl amine and diisopropyl amine; phenol; 2,4-diisobutylphenol; methyl ethyl ketoxime; α-pyrrolidone; alcohols such as methanol, ethanol, butanol and t-butyl alcohol; ethylene imine; propylene imine; benzotriazoles such as benzotriazole, 5-methylbenzotriazole, 6-ethylbenzotriazole, 5-chlorobenzotriazole, and 5-nitrobenzotriazole; methyl ethyl ketoxime (MEKO); diisopropylamine (DIPA); and combinations thereof. Presently preferred blocking agents for forming deblockable isocyanate groups include ϵ-caprolactam, diisopropylamine (DIPA), methyl ethyl ketoxime (MEKO), and mixtures thereof. For further discussion of suitable blocking techniques and suitable blocked polyisocyanate compounds, see published international application WO 2010/062928 by Doreau et al.

Deblockable isocyanate groups are but one example of functionality that may be included on the polyurethane polymer for reaction with other components of the coating composition such as a crosslinking agent. Any suitable group capable of reacting with a crosslinking agent may be included in the polyurethane polymer. Thus, for example, the polyurethane polymer may include pendant hydroxyl groups in certain embodiments.

Any suitable combination of one or more polyols can be used to form the polyurethane polymer. The one or more polyols may be a monomer, an oligomer, a polymer, or a mixture thereof. In addition, the one or more polyols can be a diol, a triol, a polyol having 4 or more hydroxyl groups, or a mixture thereof. Diols are presently preferred. Non-limiting examples of polyols for use as monomers or as ingredients for oligomer or polymer polyols include ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis(p-phenylene-oxypropanol-2), and mixtures thereof. Non-limiting examples of suitable oligomer and/or polymer polyols include polyether polyols, polyester polyols, polyether-ester polyols, polyurea polyols, polyamide polyols, polycarbonate polyols, saturated or unsaturated polyolefin polyols, and combinations thereof. Suitable polyol monomers may include, for example, glycols and/or glycerol.

In some embodiments, the polyurethane polymer is formed through an optional polyurethane prepolymer intermediate. The polyurethane prepolymer preferably includes at least one isocyanate group. More preferably, the polyurethane prepolymer has at least one terminal isocyanate group, and more preferably at least two terminal isocyanate groups. Such isocyanate-terminated prepolymers may be produced, for example, by reacting an organic material preferably having at least two active hydrogen groups per molecule with an isocyanate compound, more preferably a polyisocyanate compound such as a diisocyanate. Non-limiting examples of suitable "active hydrogen groups" include groups having a hydrogen attached to oxygen (O), sulfur (S), and/or nitrogen (N) atoms as in the groups —OH, —COOH, —SH, =NH, and —$NH_2$. Non-limiting examples of suitable organic materials may include acrylics, alkyds, polyesters, polyethers, polyamides, or mixtures thereof, preferably having two or more active hydrogen groups, and more preferably two or more hydroxyl groups.

In certain preferred embodiments, a polyol is used to form the polyurethane prepolymer. Preferably, a stiochiometric excess of isocyanate is reacted with the polyol. Non-limiting examples of suitable equivalents ratio of isocyanate groups to hydroxyl groups range from about 1.1:1 to 3:1 (NCO:OH), more preferably from about 1.2:1 to 2.5:1, and even more preferably from about 1.3:1 to 2:1. In one embodiment, a diol is reacted with a diiscocyanate (preferably pursuant to the above equivalents ratio) to yield the polyurethane prepolymer.

Presently preferred polyurethane prepolymers have an Mn from about 1,000 to about 10,000, more preferably from about 2,500 to about 7,500.

Preferably, the polyurethane prepolymer includes a sufficient number of salt and/or salt-forming groups to allow the prepolymer to form a stable aqueous dispersion when combined with an aqueous carrier. The salt and/or salt-forming groups may be any of the groups previously discussed. In some embodiments, a monomer or oligomer having salt or salt-forming groups may be included in the reactants used to produce the polyurethane prepolymer. In certain embodiments, an acid- or anhydride-functional, salt-group-forming monomer such as, for example, dimethylolpropionic acid or trimellitic anhydride is used to form the prepolymer. Alternatively, the prepolymer may be reacted with a compound including a salt or salt-forming group.

In some embodiments, the polyurethane prepolymer includes acid or anhydride groups (or other neutralizable groups capable of forming anionic salt groups) that are preferably neutralized with a tertiary amine. While not intending to be bound by any theory, it is believed that primary and secondary amines may unsuitably react with isocyanate groups of the prepolymer.

In some embodiments, the polyurethane prepolymer and/or polymer is prepared in a solvent system including reactive diluent. As used herein, the term "reactive diluent" relates to monomers and/or oligomers that are essentially non-reactive with the polyurethane prepolymer and/or polymer while present in the solvent phase prior to formation of the aqueous dispersion. As such, the reactive diluent is preferably devoid of groups that may react with ingredients of the polyurethane. Such groups may include, for example, isocyanate groups, hydroxyl groups, thiol groups, amine groups, imine groups, etc. The reactive diluent preferably functions as a solvent or otherwise lowers the viscosity of the blend of reactants. In certain embodiments, the use of one or more reactive diluents as a "solvent" can eliminate or reduce the need to incorporate a substantial amount of other cosolvents (such as, e.g., butanol) during processing. The reactive diluent is preferably capable of undergoing a reaction to form a polymer (typically a vinyl addition polymer) after dispersing the polyurethane polymer into an aqueous carrier.

Suitable reactive diluents may include vinyl addition monomers or oligomers such as free-radical reactive monomers and oligomers, monomers or oligomers containing carbonate functionality or glycidyl functionality, or combinations thereof. In some embodiments, the reactive diluent constitutes a portion, or all, of the ethylenically unsaturated component used to produce the vinyl polymer. Reactive diluents useful in the present invention include, for example, vinyl compounds, acrylate compounds, methacrylate compounds, acrylamides, acrylonitriles, and combinations thereof. Suitable vinyl compounds include, for example, vinyl toluene, vinyl acetate, vinyl chloride, vinylidene chloride, styrene, substituted styrenes, isoprene, butadiene, and combinations and oligomers thereof. Suitable (meth)acrylate compounds may include, for example, butyl acrylate, ethyl acrylate, 2-ethylhexyl acrylate, isobutyl acrylate, tert-butyl acrylate, methyl acrylate, 2-hydroxyethyl acrylate, poly(ethylene glycol) acrylate, isobornyl acrylate, butyl methacrylate, methyl methacrylate, ethyl methacrylate, isobutyl methacrylate, 2-hydroxyethyl methacrylate, poly(ethylene glycol) methacrylate, poly(propylene glycol) methacrylate, any other suitable (meth)acrylates disclosed herein, and combinations thereof. Methacrylates are presently preferred.

In some embodiments, the polyurethane prepolymer is optionally chain extended (or otherwise modified) to obtain a higher molecular weight polyurethane. Chain extension may be achieved by reaction of the polyurethane prepolymer with one or more chain extenders. This may occur, for example, by reacting one or more chain extenders with terminal and/or pendant isocyanate groups present on the polyurethane prepolymer. Suitable chain extenders may include, for example, alkyl amino alcohols, cycloalkyl amino alcohols, heterocyclic amino alcohols, polyamines (e.g., ethylene diamine, diethylene triamine, triethylene tetra amine, melamine, etc.), hydrazine, substituted hydrazine, hydrazide, amides, water, other suitable compounds having active hydrogen groups, ketimines prepared from any of the above amines, and combinations thereof. Preferably, the chain extension is conducted with organic polyamines, more preferably aliphatic polyamines having at least two primary amine groups. Diamines are presently preferred. If a chain extender is utilized, the linkage formed between the chain extender and the polyurethane prepolymer is preferably a urethane or urea linkage, more preferably a urea linkage.

The prepolymer may be chain extended at any suitable time, including before the dispersing step, simultaneous to the dispersing step, after the dispersing step, or any combination thereof.

In one embodiment, the prepolymer is chain extended at the same time it is dispersed into an aqueous carrier. While not intending to be bound by any theory, it is believed that simultaneous dispersing and chain extending may result in larger particle sizes, allow for a higher concentration of organic solvent to be used (if desired), and/or allow for a higher concentration of solids to be achieved without increasing the viscosity of the dispersion beyond that which can be easily processed. In addition, simultaneous dispersing and chain extending is conducive to the inclusion of protic solvents, such as alcohols, in the dispersion medium. While not intending to be bound by any theory, significant chain stopping has been observed when chain extending isocyanate-terminated polyurethane prepolymers in a dispersion medium containing high levels of protic solvent. The observed chain stopping is believed to be due to reaction of protic solvent with isocyanate groups of the polyurethane prepolymer.

As an alternative to the use of chain extenders, the so called "acetone process" may also be used to produce a polyurethane polymer having a suitably high molecular weight. The acetone process of making polyurethane polymers involves including a substantial amount of acetone in the reaction mixture used to polymerize a polyurethane polymer (see, e.g., U.S. Pat. No. 4,870,129). The acetone is typically removed (e.g., via vacuum stripping) after dispersing the resulting polyurethane polymer in an aqueous carrier. If desired, the acetone process may be used to produce a polyurethane polymer that is free of urea linkages. Nonetheless, if desired, the polyurethane polymer resulting from the acetone process may be chain extended to produce a polyurethane that optionally includes urea linkages. In some embodiments, a sulfonated polyamine, more preferably a sulfonated diamine, may be used to both chain extend and incorporate salt and/or salt-forming groups into the polyurethane resulting from the acetone process. Other suitable organic solvents that may be useful in the acetone process as a substitute for acetone include non-hydroxyl solvents that preferably have a low boiling point and low water solubility. Ketone-containing solvents are preferred.

As previously discussed, the binder of the invention is preferably formed by polymerizing the vinyl polymer (e.g., by polymerizing an ethylenically unsaturated component) in the presence of an aqueous dispersion, and more preferably in the presence an aqueous polyurethane dispersion. The vinyl polymer may be an acrylic polymer or a non-acrylic vinyl polymer. Typically, the vinyl polymer is formed via vinyl addition polymerization of an ethylenically unsaturated component. The ethylenically unsaturated component is preferably a mixture of monomers and/or oligomers that are capable of free radical initiated polymerization in aqueous medium. It is further contemplated that a cationic or anionic polymerization process may be used to form the vinyl polymer.

Suitable ethylenically unsaturated monomers and/or oligomers for inclusion in the ethylenically unsaturated component include, for example, alkyl (meth)acrylates, vinyl monomers, alkyl esters of maleic or fumaric acid, oligomers thereof, and mixtures thereof.

In certain embodiments, the vinyl polymer is an acrylic-containing vinyl polymer. Suitable alkyl(meth)acrylates include, for example, those having the structure: $CH_2{=}C(R^1)—CO—OR^2$ wherein $R^1$ is hydrogen or methyl, and $R^2$ is an alkyl group preferably containing one to sixteen carbon atoms. The $R^2$ group can be substituted with one or more, and typically one to three, moieties such as hydroxy, halo, phenyl, and alkoxy, for example. Suitable alkyl(meth)acrylates therefore encompass hydroxy alkyl(meth)acrylates. The alkyl (meth)acrylate typically is an ester of acrylic or methacrylic acid. Preferably, $R^1$ is hydrogen or methyl and $R^2$ is an alkyl group having two to eight carbon atoms. Most preferably, $R^1$ is hydrogen or methyl and $R^2$ is an alkyl group having two to four carbon atoms.

Suitable alkyl(meth)acrylates include, but are not limited to, methyl (meth)acrylate, ethyl(meth)acrylate, propyl(meth) acrylate, isopropyl (meth)acrylate, butyl(meth)acrylate, isobutyl(meth)acrylate, pentyl(meth)acrylate, isoamyl(meth) acrylate, hexyl(meth)acrylate, 2-ethylhexyl(meth)acrylate, cyclohexyl(meth)acrylate, decyl(meth)acrylate, isodecyl (meth)acrylate, benzyl (meth)acrylate, lauryl(meth)acrylate, isobornyl(meth)acrylate, octyl(meth)acrylate, nonyl(meth) acrylate, hydroxyethyl acrylate (HEA), hydroxyethyl methacrylate (HEMA), hydroxypropyl(meth)acrylate (HPMA), glycidyl(meth)acrylate (GMA), any other (meth)acrylates disclosed herein, and mixtures thereof.

Difunctional (meth)acrylate monomers may be used in the monomer mixture as well. Examples include ethylene glycol di(meth)acrylate, 1,6-hexanediol di(meth)acrylate, allyl methacrylate, and the like.

Suitable vinyl monomers include, but are not limited to, styrene, methyl styrene, alpha-methylstyrene, halostyrene, isoprene, diallylphthalate, divinylbenzene, conjugated butadiene, vinyl toluene, vinyl naphthalene, and mixtures thereof.

Other suitable polymerizable vinyl monomers for use in the ethylenically unsaturated component include acrylonitrile, acrylamide, methacrylamide, methacrylonitrile, vinyl acetate, vinyl propionate, vinyl butyrate, vinyl stearate, N-isobutoxymethyl acrylamide, N-butoxymethyl acrylamide, acrylic acid, methacrylic acid, and mixtures thereof.

Preferably, at least 40 wt-% of the ethylenically unsaturated component, more preferably at least 50 wt-%, will be selected from alkyl acrylates and methacrylates.

In some embodiments, the ethylenically unsaturated component includes one or more groups capable of forming a covalent linkage with one or more of the following: another group of the ethylenically unsaturated component, a group of the water-dispersible polyurethane polymer, a group of another ingredient of the aqueous dispersion (e.g., a crosslinking agent) and/or the finished coating composition. Some examples of such groups are provided in a later discussion included herein.

The amount of vinyl polymer present in the binder is preferably at least 5 wt-%, more preferably at least 15 wt-%, even more preferably at least 30 wt-%, and optimally at least 45 wt-%. Preferably, vinyl polymer constitutes no greater than 95 wt-%, more preferably no greater than 80 wt-%, even more preferably no greater than 70 wt-%, and optimally no greater than 65 wt-% of the binder. Such percentages are based on total weight of vinyl polymer and water-dispersible polyurethane polymer.

As previously discussed, the binder of the invention is preferably formed by emulsion polymerizing an ethylenically unsaturated component in the presence of an aqueous dispersion including a water-dispersible polymer, more preferably a water-dispersible polyurethane polymer. With regard to the conditions of the emulsion polymerization, the ethylenically unsaturated component is preferably polymerized in aqueous medium with a water-soluble free radical initiator in the presence of the water-dispersible polymer.

The temperature of polymerization of the ethylenically unsaturated component is typically from 0° C. to 100° C., preferably from 50° C. to 90° C., more preferably from 70° C. to 90° C., and even more preferably from 80° C. to 85° C. The pH of the aqueous medium is usually maintained at a pH of 5 to 12.

The ethylenically unsaturated component may be polymerized with the assistance of a polymerization initiator. For example, a polymerization initiator may be employed that thermally decomposes at the polymerization temperature to generate free radicals. Examples include both water-soluble and water-insoluble species. Non-limiting examples of suitable free radical initiators include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane; hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; percarbonates, such as di(1-cyano-1-methylethyl)peroxy dicarbonate; perphosphates, and the like; and combinations thereof.

Polymerization initiators may be used alone or, alternatively, as the oxidizing component of a redox system. If used, a redox system also preferably includes a reducing component such as, for example, ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, and combinations thereof. The reducing component is frequently referred to as an accelerator or a catalyst activator.

The initiator and accelerator are preferably used in proportion from about 0.001 to 5 wt-% each, based on the weight of monomers and/or oligomers to be copolymerized. Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe(II), and ammonium persulfate/sodium bisulfate/sodium hydrosulfite/Fe(II).

Chain transfer agents can be used to control polymer molecular weight, if desired.

The polymerization reaction of the ethylenically unsaturated component to produce the vinyl polymer may be conducted as a batch, intermittent, or continuous operation. In certain embodiments, it is desirable to charge all, or substantially all, of the ingredients to the polymerization vessel before commencing polymerization.

In one embodiment, the reactor is charged with an appropriate amount of water, water-dispersible polyurethane or other water-dispersible polymer, and free radical initiator. The reactor is then heated to the free radical initiation temperature and charged with the ethylenically unsaturated component. Preferably, water, initiator, water-dispersible polyurethane polymer, and some portion of the ethylenically unsaturated component are initially charged to the vessel. There may also be some water-miscible solvent and/or reactive diluent present. After this initial charge is allowed to react for a period of time at the polymerization temperature, the remaining ethylenically unsaturated component is added incrementally with the rate of addition being varied depending on the polymerization temperature, the particular initiator being employed, and the type and amount of monomers being polymerized. After all the monomer component has been charged, a final heating is carried out to complete the polymerization. The reactor is then cooled and the binder is recovered.

In preferred embodiments, a "batch" process is used to polymerize the ethylenically unsaturated component in the presence of the aqueous dispersion. While not intending to be bound by any theory, batch polymerization of the ethylenically unsaturated component can result in a higher molecular weight vinyl polymer that may yield desirable performance properties for certain coating end uses such as, for example, beverage end coatings. In certain preferred embodiments, the vinyl polymer has an Mn of at least about 100,000, more preferably at least about 200,000, or even more preferably at least about 300,000. The upper range of the Mn of the vinyl polymer is not restricted and may be 1,000,000 or more. In certain embodiments, however, the Mn of the polymerized ethylenically unsaturated component is less than about 1,000,000, or less than about 600,000.

Redox initiation is presently preferred for use in batch polymerizing the ethylenically unsaturated component.

It is contemplated that the benefits of a batch polymerization process may also be realized by (i) batch polymerizing, for example, a substantial portion (e.g., at least a majority) of the ethylenically unsaturated component and then later (ii) adding the balance of the ethylenically unsaturated component (e.g., through a continuous or intermittent feed) and completing the polymerization. Thus, for example, in certain embodiments, at least about 75 wt-%, more preferably at least about 85 wt-%, and even more preferably at least about 95 wt-% of the total amount of ethylenically unsaturated component is present as unreacted monomer and/or oligomer in the aqueous dispersion within a 1-hour time period (more preferably within a 30-minute time period) during polymerization of the ethylenically unsaturated component, and more preferably at the same time (e.g., at the onset of polymerization of the ethylenically unsaturated component). In one embodiment, 100% of the total amount of ethylenically unsaturated component is present as unreacted monomer and/or oligomer in the aqueous dispersion at the onset of polymerization.

Coating compositions of the invention preferably include at least a film-forming amount of the binder. In preferred embodiments, the coating composition includes at least about 5 wt-%, more preferably at least about 15 wt-%, and even more preferably at least about 25 wt-% of the binder, based on the weight of the binder solids relative to the total weight of the coating composition. Preferably, the coating composition includes less than about 65 wt-%, more preferably less than about 55 wt-%, and even more preferably less than about 45 wt-% of the binder, based on the weight of the binder solids relative to the total weight of the coating composition.

The binder may optionally include one or more covalent bonds linking the polyurethane polymer (or other water-dispersible polymer) and the vinyl polymer. While not intending to be bound by any theory, in certain embodiments, the presence of covalent linkages is believed to contribute to one or more improved coating properties. The covalent linkages may be of any suitable form and may be formed at any suitable time using any suitable reaction mechanism. For example, the covalent bonds may be formed (i) during production of the binder and/or (ii) during, or after, cure of a coating composition containing the binder. In such embodiments, the polyurethane polymer preferably includes one or more reactive functional groups capable of reacting with one or more reactive functional groups of the ethylenically unsaturated component to form a covalent linkage.

A discussion or some representative systems for forming covalent linkages between the polyurethane polymer and the ethylenically unsaturated component is provided below. The discussion is not intended to be a comprehensive listing of all possible chemistries for forming such covalent linkages. It is within the scope of the invention to use other means known in the art to form such covalent linkages.

In some embodiments, the covalent linkages are step-growth linkages (e.g., condensation linkages). Non-limiting examples of suitable covalent linkages include amide, carbonate ester, ester, epoxy, ether, imide, imine, urea, or urethane linkages, or a combination thereof. Non-limiting examples of suitable functional groups for forming step-growth linkages include reactive functional group pairs selected from oxirane, hydroxyl (—OH), thiol (—SH), carboxylic (—COOH), amine (—$NH_2$), imine (═NH), or isocyanate (—NCO), with one functional group present in the polyurethane polymer and the other present in the ethylenically unsaturated component and/or the vinyl polymer resulting therefrom.

Preferably, the covalent linkages are hydrolytically stable, or at least substantially hydrolytically stable. While ester bonds may be used, ester bonds do not typically exhibit good hydrolytic stability.

In one embodiment, an imine linkage may covalently link the polyurethane polymer and the vinyl polymer. Such an imine linkage may be formed, for example, by reacting an acetoacetate group and a Schiff base group (e.g., an amine functional group such as a group formed from an adipic dihydrazide group).

In some embodiments, the covalent linkages are substituted or unsubstituted hydrocarbyl linkages. Examples of hydrocarbyl linkages include carbon chains (e.g., substituted or unsubstituted divalent alkyl chains such as, e.g., —$CH_2CH_2$—) formed via reaction of a functional group of the polyurethane polymer and a functional group of the ethylenically unsaturated component and/or the resulting vinyl polymer. Hydrocarbyl linkages may be formed, for example, through hydrogen abstraction, free-radical initiated polymerization, a Diels-Alder reaction, Michael Addition, or a combination thereof.

In some embodiments, the ethylenically unsaturated component and/or the polyurethane polymer includes one or more oxirane moieties. In one embodiment, the ethylenically unsaturated component used to produce the vinyl polymer includes at least one oxirane group-containing alpha, beta-ethylenically unsaturated monomer and/or oligomer. Such optional materials, when present, are typically included in the ethylenically unsaturated component in an amount from 0.1 wt-% to 30 wt-%, more preferably 1 wt-% to 10 wt-%. Glycidyl methacrylate is an example of a preferred oxirane group-containing alpha, beta-ethylenically unsaturated monomer. For further examples of suitable oxirane-functional monomers see U.S. 2006/0100366. Preferably, at least one of the polyurethane polymer and the vinyl polymer includes an oxirane group and at least the other includes an acid and/or anhydride group. The reaction of tertiary amines with materials containing oxirane groups, when carried out in the presence of water, can afford a product that contains both a hydroxyl group and a quaternary ammonium hydroxide. Under preferred conditions, an acid group, an oxirane group, and an amine form a quaternary salt. This linkage is favored in certain embodiments (e.g., over ester linkages), as it not only links the polyurethane and vinyl polymer but promotes water dispersibility of the joined polymer. (It should be noted that an acid group and an oxirane group may also form an ester. Some of this reaction is possible, though this linkage is typically less desirable when water dispersibility is sought.) For further discussion regarding quaternary ammonium salt groups and suitable conditions for forming such groups see U.S. 2006/0100366.

In some embodiments, the vinyl polymer and the polyurethane polymer are grafted together through a reaction involving an aliphatic carbon-carbon double bond present in the polyurethane polymer. Grafting may be achieved through the aliphatic carbon-carbon double bond using, for example, a free-radical initiated polymerization process.

Aliphatic carbon-carbon double bonds may be introduced into the polyurethane polymer using any suitable compound. The aliphatic carbon-carbon double bonds may be included in a backbone segment of the polyurethane, a pendant group of the polyurethane, or a combination of both. Preferably, the aliphatic carbon-carbon double bonds are capable of participating in one or more of the following reactions: a Diels-Alder reaction, a free-radical initiated polymerization, a Michael Addition, or an ionic polymerization. In certain embodiments, aliphatic carbon-carbon double bonds may be introduced into the polyurethane using a compound having one or more active hydrogen groups (e.g., —OH, —SH, —COOH, —$NH_2$, ═NH, etc.) and one or more aliphatic carbon-carbon double bonds. Non-limiting examples of such compounds include acid or anhydride-functional compounds such as maleic anhydride, itaconic anhydride, nonenylsuccinic anhydride, citraconic anhydride, fumaric anhydride, and acid or ester variants thereof; functionalized (poly)alkenes such as functionalized (poly)butadiene (e.g., hydroxylated polybutadiene) or functionalized unsaturated fatty acids (e.g., mono- or polyunsaturated fatty acids such as arichidonic, eleostearic, erucic, licanic, linoleic, linolenic, oleic, palmitoleic, ricinoleic acid, and mixtures thereof); functionalized alpha, beta ethylenically unsaturated monomers (e.g., acrylic acid, methacrylic acid, acrylamide, methacrylamide, hydroxy ethyl acrylate, hydroxy propyl acrylate, hydroxy propyl methacrylate, glycidyl acrylate, or glycidyl methacrylate); or combinations thereof.

In one embodiment, a hydroxyl group of a hydroxy-functionalized alpha, beta ethylenically unsaturated monomer such as hydroxy propyl methacrylate is reacted with a terminal isocyanate group of the polyurethane polymer. The resulting unsaturated end group may be used to graft together the polyurethane polymer and the ethylenically unsaturated component (e.g., using a free radical initiated process).

The polyurethane polymer can include one or more optional alkene or polyalkene groups (referred to collectively herein as "(poly)alkene" groups), more preferably one or more (poly)alkene moieties, having at least one aliphatic carbon-carbon double bond. In certain embodiments, the inclusion of (poly)alkene groups has been observed to yield a desirable balance of coating properties such as good hardness, good chemical resistance, and good flexibility. While not intending to be bound by any theory, it is believed that the presence of (poly)alkene groups such as, e.g., polybutadiene contributes to the formation of crosslinks (upon coating cure) between (poly)alkene groups of the polyurethane polymer (either intra-polymer crosslinks within the same polymer strand or crosslinks between separate polymer strands). In some embodiments, (poly)alkene groups having at least some vinylic carbon-carbon double bonds are preferred.

The (poly)alkene groups may be substituted or unsubstituted. Moreover, the (poly)alkene groups may be backbone groups or pendant groups. Non-limiting examples of suitable (poly)alkene groups include groups formed from functionalized butadiene or polybutadiene, unsaturated fatty acids (e.g., mono- or polyunsaturated fatty acids such as arichidonic, eleostearic, erucic, licanic, linoleic, linolenic, oleic, palmitoleic, ricinoleic acid, and mixtures thereof), polyisoprene, poly-EPDM (ethylene propylene diene monomer), modified poly-EPDM (e.g., modified with dicyclopentadiene, vinyl norbornene, etc.), or a combination thereof. Fully hydrogenated (poly)alkene groups, such as for example backbone segments formed from fully hydrogenated polybutadiene compounds, are not (poly)alkene groups.

When present, the (poly)alkene groups are preferably included in an amount of at least about 1 wt-%, more preferably at least about 5 wt-%, and even more preferably at least about 15 wt-%, based on the total weight of the polyurethane polymer. The (poly)alkene groups are preferably included in an amount of less than about 80 wt-%, more preferably less than about 50 wt-%, and even more preferably less than about 20 wt-%, based on the total weight of the polyurethane polymer.

Iodine value is another useful measure for characterizing the average number of aliphatic (including cycloaliphatic) carbon-carbon double bonds present in a material. The polyurethane polymer may have any suitable iodine value to achieve the desired result. In some embodiments, the polyurethane polymer has an iodine value of at least about 10, more preferably at least about 20, even more preferably at least about 35, and optimally at least about 50. The upper range of suitable iodine values is not limited, but in most embodiments the iodine value typically will not exceed about 120, more typically will not exceed about 100, even more typically will not exceed about 80. The aforementioned iodine values correspond to the number of grams of iodine that will react with the double bonds present in 100 grams of the material tested. Iodine values may be determined, for example, using ASTM D 5758-02 (Reapproved 2006) entitled “Standard Method for Determination of Iodine Values of Tall Oil Fatty Acids,” and are expressed in terms of mole equivalents of iodine per 100 grams of resin.

In embodiments utilizing (poly)alkene groups, an optional metal catalyst may be included in the composition to assist in covalent bond formation. Non-limiting examples of suitable oxidation catalysts include transition metals, complexes of transition metals, photoinitiators and the like, and mixtures thereof.

Suitable transition metals may include cobalt, iron, nickel, aluminum, ruthenium, rhodium, palladium, antimony, osmium, iridium, platinum, copper, manganese, and zinc, as well as oxides, salts or complexes of these metals, and mixtures thereof. For example, cobalt II salts of short chain acids such as acetic acid or terephthalic acid, or long chain acids such as neodecanoic, stearic, 2-ethyl hexanoic, or octenyl succinic acid may be used. Salts of inorganic acids may also be used. For example, antimony chloride III, antimony chloride V, and cobalt chloride may be used. Preferred catalysts include salts of cobalt and long chain acids such as, for example, cobalt acetate, cobalt neodecanoate, cobalt stearate, cobalt octoate, and mixtures thereof. As an alternative and/or supplement to the above metal catalysts, the polyurethane polymer may include one or more optional ether linkages.

The (poly)alkene groups may be introduced into the polyurethane polymer using any suitable means. For example, the (poly)alkene groups may be introduced via reaction with one or more reactants used to form the polymer. Alternatively, the polyurethane polymer may be post-modified to include the (poly)alkene groups. The (poly)alkene groups may be monovalent or polyvalent (e.g., divalent or trivalent), preferably monovalent or divalent, more preferably divalent.

The (poly)alkene groups may be incorporated using any suitable reaction process. By way of example, the following reaction pathways may be used: step-growth reactions (e.g., condensation reactions), free radical initiated reactions, Diels-Alder reactions, etc. Non-limiting examples of suitable groups for linking the (poly)alkene segment to one or more other portions of the polyurethane polymer include any of the linkages groups disclosed herein, including, for example, step-growth or hydrocarbyl linkages.

In some embodiments, the (poly)alkene group may be incorporated into the polymer via reaction of (i) one or more active hydrogen groups present in a compound containing the (poly)alkene with (ii) a counterpart active hydrogen group present on the polymer or a reactant used to form the polymer. Non-limiting examples of suitable active hydrogen groups include any of the active hydrogen groups disclosed herein.

The following are some examples of methods for introducing (poly)alkene groups into the polyurethane polymer:

1. A hydroxyl-functional (poly)alkene may be incorporated into the polymer via reaction of the hydroxyl groups with isocyanate and/or carboxylic acid groups present on the polymer or a reactant used to form the polymer.
2. A maleinized (poly)alkene (e.g., a (poly)alkene modified with maleic anhydride such as maleinized polybutadiene) may be incorporated into the polymer via reaction of acid and/or anhydride groups with hydroxyl groups present on the polymer or a reactant used to form the polymer.
3. A maleinized (poly)alkene (e.g., maleinized polybutadiene) may be incorporated into a polymer through hydrolysis of an anhydride group and subsequent epoxy esterification with a group present on the polymer or a reactant used to form the polymer.
4. A maleinized (poly)alkene (e.g., maleinized polybutadiene) may be incorporated into the polymer via amide formation through reaction of the acid/anhydride group with a primary amine group on the polymer or a reactant used to form the polymer.
5. An epoxy-functional (poly)alkene may be incorporated into the polymer through reaction of an epoxy group with a carboxylic acid group present on the polymer or a reactant used to form the polymer, or through quaternary ammonium salt formation.
6. A (poly)alkene having acrylic or methacrylic functionality may be incorporated into the polymer or a reactant used to form the polymer via free radical polymerization.
7. A carboxylic acid-functional (poly)alkene may be incorporated into the polymer or a reactant used to form the polymer via esterification with hydroxyls or epoxy esterification with oxirane groups.

(Poly)butadiene groups, and polybutadiene backbone segments in particular, are preferred (poly)alkene groups.

Hydroxyl-terminated polybutadiene is a presently preferred compound for forming (poly)alkene groups. In one embodiment, hydroxyl-terminated polybutadiene is included in the reactants used to form the water-dispersible polyurethane polymer.

In some embodiments, unsaturated cyclic groups, more preferably unsaturated polycyclic groups (i.e., at least bicyclic groups) such as, for example, unsaturated bicyclic groups (e.g., norbornene groups), may be included in the polyurethane polymer either in place of and/or in addition to the optional (poly)alkene groups. In one embodiment, the unsaturated polycyclic group includes a bicyclic structure represented by the IUPAC (International Union of Pure and Applied Chemistry) nomenclature of the below Expression (I):

bicyclo[x.y.z]alkene

In Expression (I), x is an integer having a value of 2 or more, y is an integer having a value of 1 or more, z is an integer having a value of 0 or more, and the term alkene refers to the IUPAC nomenclature designation (e.g., hexene, heptene, heptadiene, octene, etc.) for a given bicyclic molecule and denotes that the bicyclic group includes one or more double bonds (e.g. >1, >2, >3 double bonds).

Preferably z in Expression (I) is 1 or more. In other words, preferred bicyclic groups include a bridge with a least one atom (typically one or more carbon atoms) interposed between a pair of bridgehead atoms, where the at least one atom is shared by at least two rings. By way of example, bicyclo[4.4.0]decane does not include such a bridge.

In preferred embodiments, x has a value of 2 or 3 (more preferably 2) and each of y and z independently have a value of 1 or 2.

Non-limiting examples of some suitable groups represented by Expression (I) include monovalent or polyvalent (e.g., divalent) variants of bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. Bicyclo[2.2.1]heptene is a presently preferred unsaturated polycyclic group.

It is contemplated that the unsaturated cyclic groups represented by Expression (I) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic UC group) or acyclic groups may be attached to the bicyclic group represented by Expression (I). Thus, for example, in some embodiments the bicyclic group of Expression (I) may be present in a tricyclic or higher group.

A discussion of materials and methods for introducing unsaturated cyclic groups into polymers, including unsaturated bicyclic groups, is provided in International Application No. PCT/US2010/030584 filed on Apr. 9, 2010 and entitled "Polymer Having Unsaturated Cycloaliphatic Functionality and Coating Compositions Formed Therefrom." By way of example, a Diels-Alder reaction may be used to modify an unsaturated polyurethane (e.g., using cyclopentadiene or dicyclopentadiene) to include an unsaturated bicyclic group. Alternatively, the polyurethane polymer may be formed using reactants having unsaturated polycyclic groups such as, for example, nadic acid or anhydride, methyl-nadic acid or anhydride, tetrahydrophthalic acid or anhydride, methyltetrahydrophthalic acid or anhydride, and mixtures thereof.

As previously discussed, the coating composition of the invention preferably includes water and may further include one or more optional organic solvents. Preferably, the coating composition includes at least about 20 wt-%, more preferably at least about 25 wt-%, and even more preferably at least about 30 wt-% of water, based on the weight of the coating composition. In some embodiments, the coating composition includes less than about 90 wt-%, more preferably less than about 60 wt-%, and even more preferably less than about 40 wt-% of water, based on the total weight of the coating composition.

In certain embodiments, the coating composition preferably includes one or more organic solvents in an amount of at least about 10 wt-%, more preferably at least about 20 wt-%, and even more preferably at least about 25 wt-%, based on the weight of the coating composition. In some embodiments, the coating composition includes less than about 70 wt-%, more preferably less than about 60 wt-%, and even more preferably less than about 45 wt-% of organic solvent, based on the total weight of the coating composition. While not intending to be bound by any theory, the inclusion of a suitable amount of organic solvent is advantageous, for example, for certain coil coating applications to modify flow and leveling of the coating composition, control blistering, and maximize the line speed of the coil coater. Moreover, vapors generated from evaporation of the organic solvent during cure of the coating may be used to fuel the curing ovens.

The ratio of water to optional organic solvent in the coating composition can vary widely depending on the particular coating end use and application methodology. In some embodiments the weight ratio of water to organic solvent in the final coating composition ranges from about 0.1:1 to 10:1, (water:organic solvent) more preferably from about 0.2:1 to 5:1, and even more preferably from about 0.7:1 to 1.3:1.

The coating composition preferably has a total solids content of from about 10 to about 70 wt-%, more preferably from about 20 to about 50 wt-%, and even more preferably from about 30 to about 40 wt-%, based on the weight of the coating composition.

In one embodiment, the coating composition includes 5 to 65 wt-% of the binder (more preferably 15 to 55 wt-%, even more preferably 25 to 45 wt-%), 20 to 60 wt-% of water (more preferably 25 to 50 wt-%, even more preferably 30 to 40 wt-%), and 10 to 70 wt-% of organic solvent (more preferably 20 to 60 wt-%, even more preferably 25 to 45 wt-%).

Coating compositions of the invention may be formulated using one or more optional curing agents (i.e., crosslinking resins, sometimes referred to as "crosslinkers"). The choice of particular crosslinker typically depends on the particular product being formulated. Non-limiting examples of crosslinkers include aminoplasts, phenoplasts, blocked isocyanates, and combinations thereof. Preferred curing agents are substantially free of mobile BPA and aromatic glycidyl ether compounds (e.g., BADGE, BFDGE and epoxy novalacs).

The amount of crosslinker included may depend on a variety of factors, including, for example, the type of curing agent, the time and temperature of the bake, the molecular weight of the polymer, and the desired coating properties. If used, the crosslinker is typically present in an amount of up to 50 wt-%, preferably up to 30 wt-%, and more preferably up to 15 wt-%. If used, the crosslinker is typically present in an amount of at least 0.1 wt-%, more preferably at least 1 wt-%, and even more preferably at least 1.5 wt-%. These weight percentages are based upon the total weight of the resin solids in the coating composition.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine Examples of suitable aminoplast resins include, without limitation, benzoguanamine-formaldehyde resins, melamine-formaldehyde resins, esterified melamine-formaldehyde, and urea-formaldehyde resins.

Condensation products of other amines and amides can also be employed such as, for example, aldehyde condensates of triazines, diazines, triazoles, guanadines, guanamines and alkyl- and aryl-substituted melamines Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL 301, CYMEL 303, CYMEL 370, CYMEL 373, CYMEL 1131, CYMEL 1125, and CYMEL 5010 (all available from Cytec Industries Inc., West Patterson, N.J.), URAMEX BF 892 (available from DSM, Netherlands), MAPRENAL MF 980, and mixtures thereof.

Non-limiting examples of suitable isocyanate crosslinkers include blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have an Mn of at least about 300, more preferably at least about 650, and even more preferably at least about 1,000.

Polymeric blocked isocyanates are preferred in certain embodiments. Some examples of suitable polymeric blocked isocyanates include a biuret or isocyanurate of a diisocyanate, a trifunctional "trimer," or a mixture thereof. Examples of suitable blocked polymeric isocyanates include TRIXENE BI 7951, TRIXENE BI 7984, TRIXENE BI 7963, TRIXENE BI 7981 (TRIXENE materials are available from Baxenden Chemicals, Ltd., Accrington, Lancashire, England), DESMODUR BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117, and DESMODUR VP LS 2352 (DESMODUR materials are available from Bayer Corp., Pittsburgh, Pa., USA), or combinations thereof. Examples of suitable trimers may include a trimerization product prepared from on average three diisocyanate molecules or a trimer prepared from on average three moles of diisocyanate (e.g., HMDI) reacted with one mole of another compound such as, for example, a triol (e.g., trimethylolpropane).

In some embodiments, the coating composition of the invention, based on total resin solids, includes at least 5 wt-% of blocked polymeric isocyanate, more preferably from about 5 to about 20 wt-% of blocked polymeric isocyanate, and even more preferably from about 10 to about 15 wt-% of blocked polymeric isocyanate.

A coating composition of the present invention may also include other optional polymers that do not adversely affect the coating composition or a cured coating composition resulting therefrom. Such optional polymers are typically included in a coating composition as a filler material, although they can be included as a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

A coating composition of the present invention may also include other optional ingredients that do not adversely affect the coating composition or a cured coating composition resulting therefrom. Such optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, surfactants, and mixtures thereof. Each optional ingredient is included in a sufficient amount to serve its intended purpose, but not in such an amount to adversely affect a coating composition or a cured coating composition resulting therefrom.

One preferred optional ingredient is a catalyst to increase the rate of cure. Examples of catalyst, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, tin and zinc compounds, and combinations thereof. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material. If used, a catalyst is preferably present in an amount of no greater than 3 wt-%, and more preferably no greater than 1 wt-%, based on the weight of nonvolatile material in the coating composition.

Another useful optional ingredient is a lubricant (e.g., a wax), which facilitates manufacture of fabricated metal articles (e.g., food or beverage cans, food or beverage can ends, metal closures for food containers, etc.) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt-%, and preferably no greater than 2 wt-%, and more preferably no greater than 1 wt-%, based on the weight of nonvolatile material in the coating composition.

Another useful optional ingredient is a pigment, such as titanium dioxide. If used, a pigment is present in the coating composition in an amount of no greater than 70 wt-%, more preferably no greater than 50 wt-%, and even more preferably from 0.01 to 40 wt-%, based on the total weight of nonvolatile material in the coating composition.

Surfactants can be optionally added to the coating composition to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt-%, and more preferably at least 0.1 wt-%, based on the weight of resin solids. If used, a surfactant is preferably present in an amount no greater than 10 wt-%, and more preferably no greater than 5 wt-%, based on the weight of resin solids.

Cured coatings of the invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to, for example, food or beverage products. The coatings may be applied to any suitable surface, including inside surfaces of containers, outside surfaces of containers, container ends, and combinations thereof.

Cured coatings of the invention are particularly well suited as adherent coatings for metal cans or containers, although many other types of articles can be coated. Examples of such articles include closures (including, e.g., internal surfaces of twist off caps for food and beverage containers); crowns; two and three-piece cans (including, e.g., food and beverage containers); shallow drawn cans; deep drawn cans (including, e.g., multi-stage draw and redraw food cans); can ends (including, e.g., easy open can ends or beer and beverage can ends); monobloc aerosol containers; medical packaging articles (e.g., metered dose inhaler cans, including on drug-contact surfaces); and general industrial containers, cans, and can ends.

The coating compositions of the present invention are particularly well adapted for use on food and beverage cans, and particularly beverage can ends such as beer or soda can ends (which typically include a rivet portion for attachment of a pulltab to the can end). Preferred coating compositions of the invention are particularly suited for use on inner metal surfaces of food or beverage containers (e.g., food-contact surfaces), including as a topcoat (of a multilayer or monolayer coating system) in direct contact with food or beverage products.

Coating compositions of the invention can be applied on a substrate in a single coat, or monocoat, system or can constitute one or more layers of a multi-coat system. The coating compositions can be applied, for example, either directly to a surface of a substrate or to one or more intermediate coats (e.g., size coats) applied on the substrate. In some embodiments, the coating composition of the invention is applied as a monocoat directly to, for example, an exterior or interior (i.e., food-contact) surface of a metal food or beverage can.

The coating composition can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In one embodiment where the coating is used to coat metal sheets or coils, the coating can be applied by roll coating. Other commercial coating application and curing methods are also envisioned including, for example, electrocoating, extrusion coating, laminating, powder coating, and the like.

The coating composition can be applied on a substrate prior to, or after, forming the substrate into an article. In some embodiments, at least a portion of a planar substrate is coated with a layer of the coating composition of the invention, which is then cured before the planar substrate is formed into an article (e.g., a food or beverage can end). By way of example, in some embodiments, an article such as a food or beverage is stamped from planar metal substrate having a cured coating composition of the invention thereon.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, coating compositions of the invention can be dried and cured in one step.

The curing process may be performed at any suitable temperature, including, for example, temperatures in the range of about 177° C. to about 250° C. If metal coil is the substrate to be coated, curing of the applied coating composition may be conducted, for example, by subjecting the coated metal to a temperature of about 225° C. to about 250° C. for typically about 10 to 30 seconds. The cure conditions will vary depending upon the method of application and the intended end use.

Preferred coatings of the present invention display one or more of the properties described in the Test Methods or Examples sections. More preferred coatings of the present invention display one or more of the following properties: adhesion rating of 10; blush rating of at least 7; feathering below 0.2 inches; an initial end continuity of less than 10 milliamps ("mA") (more preferably less than 5, 2, or 1 mA); and after pasteurization or retort, an end continuity of less than 20 mA.

Some additional embodiments of the invention are provided below:

Embodiment 1 :A binder comprising:

an aqueous dispersion of a polymer (e.g., a water-dispersible acrylic, alkyd, polyester, or polyurethane polymer, more preferably a water-dispersible polyurethane polymer) having one or more pendant or backbone (poly)alkene groups; and a vinyl polymer.

Embodiment 1.5 :A binder comprising an aqueous dispersion of a polymer, more preferably a water-dispersible polyurethane polymer, having 2 or more backbone urethane linkages, more preferably 10 or more backbone urethane linkages, and even more preferably 20 or more backbone urethane linkages; and a vinyl polymer.

Embodiment 2 :A binder comprising:

an aqueous dispersion of a polymer (e.g., a water-dispersible acrylic, alkyd, polyester, or polyurethane polymer, more preferably a water-dispersible polyurethane polymer); and a vinyl polymer;

wherein the polymer of the aqueous dispersion and the vinyl polymer are linked together by one or more covalent linkages.

Embodiment 2.1 :The binder of Embodiment 2 or a sub-embodiment thereof, wherein the one or more covalent linkages is a step-growth linkage (e.g., a condensation linkage), a substituted or unsubstituted hydrocarbyl linkage, or a combination thereof.

Embodiment 2.2: The binder of Embodiment 2 or a sub-embodiment thereof, wherein the one or more covalent linkages comprises a carbonate ester, ester, epoxy, ether, imide, imine, or urea linkage, or a combination thereof.

Embodiment 2.3: The binder of Embodiment 2 or a sub-embodiment thereof, wherein the one or more covalent linkages are hydrolytically stable.

Embodiment 2.4: The binder of Embodiments 1, 1.5, 2 or a sub-embodiment thereof, wherein the binder comprises a latex polymer.

Embodiment 2.5: The binder of Embodiments 1, 1.5, 2 or a sub-embodiment thereof, wherein the binder comprises an emulsion polymerized latex polymer.

Embodiment 2.6: The binder of any of Embodiments 1, 1.5, 2 or a sub-embodiment thereof, wherein the polymer of the aqueous dispersion has an Mn of at least 5,000, more preferably at least 10,000, even more preferably at least 30,000.

Embodiment 2.7: The binder of Embodiments 1, 1.5, 2 or a sub-embodiment thereof, wherein the vinyl polymer has a $M_r$, of at least 100,000, more preferably at least 200,000, and even more preferably at least 300,000.

Embodiment 2.8: The binder of Embodiments 1, 1.5, 2 or a sub-embodiment thereof, wherein the polyurethane polymer is present in amount comprising at least 5 wt-%, more preferably at least 20 wt-%, even more preferably at least 30 wt-%, and optimally at least 35 wt-%, based on the total weight of the polyurethane polymer and the vinyl polymer.

Embodiment 2.9: The binder of Embodiments 1, 1.5, 2 or a sub-embodiment thereof, wherein the vinyl polymer is present in amount comprising at least 5 wt-%, more preferably at least 15 wt-%, even more preferably at least 30 wt-%, and optimally at least 45 wt-%, based on the total weight of the polyurethane polymer and the vinyl polymer.

Embodiment 2.10: The binder of Embodiments 1, 1.5, 2 or a sub-embodiment thereof, wherein the polyurethane polymer is formed from reactants comprising at least 0.1 wt-%, preferably at least 1 wt-%, and even more preferably at least 5 wt-% of a mono- or poly-isocyanate compound.

Embodiment 2.11: The binder of Embodiments 1, 1.5, 2 or a sub-embodiment thereof, wherein the water-dispersible polyurethane polymer is a chain-extended polyurethane polymer.

Embodiment 2.12: The binder of Embodiments 2.11, wherein the polyurethane polymer is chain extended with a polyamine chain extender.

Embodiment 2.13: The binder of Embodiments 1, 1.5, 2 or a sub-embodiment thereof wherein the water-dispersible polyurethane polymer is a polyurethane-urea polymer.

Embodiment 2.14: The binder of Embodiments 1.5 or 2 or a sub-embodiment thereof, wherein the polymer of the aqueous dispersion has one or more pendant or backbone (poly) alkene groups.

Embodiment 2.15: The binder of Embodiments 1, 1.5, 2 or a sub-embodiment thereof, wherein the vinyl polymer is formed by polymerizing an ethylenically unsaturated component in the presence of the aqueous dispersion.

Embodiment 2.16: The binder of Embodiments 1 or 2 or a sub-embodiment thereof, wherein the water-dispersible polyurethane polymer includes at least 2 urethane linkages, more preferably at least 10 urethane linkages, and even more preferably at least 20 urethane linkages.

Embodiment 2.17: The binder of Embodiments 1, 1.5, 2 or a sub-embodiment thereof, wherein the water-dispersible polyurethane polymer includes at least 1 urea linkage, more preferably at least 5 urea linkages, and even more preferably at least 10 urea linkages.

Embodiment 2.18: The binder of Embodiments 1, 1.5, 2 or a sub-embodiment thereof, wherein the water-dispersible polyurethane polymer does not include any structural units derived from an aromatic isocyanate compound.

Embodiment 2.19: The binder of Embodiments 1, 1.5, 2 or a sub-embodiment thereof, wherein the water-dispersible polyurethane polymer includes one or more unsaturated polycyclic groups, more preferably one or more unsaturated bicyclic groups, and even more preferably one or more bridged bicyclic groups (e.g., a norbornene-type group).

Embodiment 3: A coating composition comprising:

a binder (or system) of Embodiments 1, 1.5, 2 or a sub-embodiment thereof; and a liquid carrier.

Embodiment 3.1: The coating composition of Embodiment 3, wherein the coating composition includes at least 5 wt-%, more preferably at least 15 wt-%, and even more preferably at least 25 wt-% of the binder.

Embodiment 3.2: The coating composition of Embodiment 3 or any sub-embodiment thereof, wherein the carrier includes water and an optional organic solvent.

Embodiment 3.3: The coating composition of Embodiment 3 or any sub-embodiment thereof, wherein the coating composition includes at least 10 wt-%, more preferably at least 20 wt-%, and even more preferably at least 25 wt-% of organic solvent.

Embodiment 3.4: The coating composition of Embodiment 3 or any sub-embodiment thereof, wherein the coating composition includes at least 20 wt-%, more preferably at least 25 wt-%, and even more preferably at least 30 wt-% of water.

Embodiment 3.5: The coating composition of sub-embodiments 3.1-3.4, wherein the weight ratio of water to organic solvent in the coating composition is from 0.1:1 to 10:1 (water:organic solvent).

Embodiment 3.6: The coating composition of Embodiment 3 or any sub-embodiment thereof, wherein the coating composition is substantially free of bound bisphenol A or aromatic glycidyl ether compounds.

Embodiment 3.7: The coating composition of Embodiment 3 or any sub-embodiment thereof, further comprising a crosslinker, preferably in an amount of at least 1 wt-%, based on the total weight of the coating composition.

Embodiment 3.8: The coating composition of Embodiment 3 or any sub-embodiment thereof, wherein the coating composition, when present on an aluminum beverage can end at a dry film thickness of 7 milligrams per square inch, passes less than 10 milliamps of current (more preferably less than 5 milliamps, even more preferably less than 1 milliamps) after being exposed for 4 seconds to a room-temperature electrolyte solution containing 1% by weight of NaCl dissolved in water.

Embodiment 3.9: The coating composition of Embodiment 3 or any sub-embodiment thereof, wherein the coating composition includes one or more lubricants, preferably in an amount from about 0.1 to 2 wt-%, based on the weight of nonvolatile material in the coating composition.

Embodiment 4: An article, comprising:

a metal substrate; and the coating composition of Embodiment 3 or any sub-embodiment thereof disposed on at least a portion of a surface of the metal substrate.

Embodiment 4.1: The article of Embodiment 4, wherein the article comprises a metal packaging can.

Embodiment 4.2: The article of Embodiment 4, wherein the article comprises a food or beverage can, or a portion thereof.

Embodiment 4.3: The article of Embodiment 4.2, wherein the coating composition is disposed on a food-contact surface.

Embodiment 4.4: The article of Embodiment 4.2, wherein the coating composition is present as a top coat of a mono-coat or multi-coat coating system.

Embodiment 4.5: The article of Embodiment 4 or any sub-embodiment thereof, wherein the coating composition comprises a cured coating.

Test Methods

The following test methods may be useful in evaluating the properties of coating compositions of the invention.

Solvent Resistance

The extent of "cure" or crosslinking of a coating is measured as a resistance to solvents, such as methyl ethyl ketone (MEK, available from Exxon, Newark, N.J.) or isopropyl alcohol (IPA). This test is performed as described in ASTM D 5402-93. The number of double-rubs (i.e., one back-and forth motion) is reported. This test if often referred to as "MEK Resistance."

Adhesion

Adhesion testing is performed to assess whether the coating adheres to the coated substrate. The adhesion test was performed according to ASTM D 3359-Test Method B, using SCOTCH 610 tape (available from 3M Company of Saint Paul, Minn.). Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Sterilization or Pasteurization test. Testing is accomplished by subjecting the substrate to heat ranging from 105-130° C. and pressure ranging from 0.7 to 1.05 kg/cm$^2$ for a period of 15 to 90 minutes. For the present evaluation, the coated substrate was immersed in deionized water and subjected to heat of 121° C. (250° F.) and pressure of 1.05 kg/cm$^2$ for a period of 90 minutes. The coated substrate was then tested for adhesion and blush as described above. In food or beverage applications requiring retort performance, adhesion ratings of 10 and blush ratings of at least 7 are typically desired for commercially viable coatings.

Feathering

Feathering is a term used to describe the adhesion loss of a coating on the tab of a beverage can end. When a beverage can is opened, a portion of free film may be present across the opening of the can if the coating loses adhesion on the tab. This is feathering.

To test feathering, a "tab" is scored on the backside of a coated panel, with the coated side of the panel facing downward. The test piece is then pasteurized as described under the Pasteurization section below.

After pasteurization, pliers are used to bend the cut "tab" to a 90-degree angle away from the coated side of the substrate. The test piece is then placed on a flat surface, coated side down. The cut "tab" is gripped using pliers and the "tab" is pulled from the test panel at an angle of 180 degrees until it is completely removed. After removing the "tab," any coating that extends into the opening on the test panel is measured. The distance of the greatest penetration (feathering) is reported in inches. Coatings for beverage can ends preferably show feathering below 0.2 inch (0.508 cm), more preferably below 0.1 inch (0.254 cm), most preferably below 0.05 inch (0.127 cm), and optimally below 0.02 inch (0.051 cm).

Dowfax Detergent Test

The "Dowfax" test is designed to measure the resistance of a coating to a boiling detergent solution. This is a general test run for beverage end coatings and is mainly used to evaluate adhesion. Historically, this test was used to indicate problems with the interaction of coating to substrate pretreatment. The solution is prepared by mixing 5 ml of Dowfax 2A1 (product of Dow Chemical) into 3000 ml of deionized water. Typically, coated substrate strips are immersed into the boiling Dowfax solution for 15 minutes. The strips are then rinsed and cooled in deionized water, dried, and then tested and rated for blush and adhesion as described previously. Preferred beverage end coatings provide adhesion ratings of 10 and blush ratings of at least 4, more preferably 6 or above in the Dowfax detergent test.

Sterilization or Pasteurization

The sterilization or pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in a deionized water bath for 45 minutes at 85° C. The coated substrate was then removed from the water bath and tested for coating adhesion and blush as described above. Commercially viable coatings preferably provide adequate pasteurization resistance with perfect adhesion (rating of 10) and blush ratings of at least 5, optimally at least 9.

Fabrication or End Continuity

This test measures the ability of a coated substrate to retain its integrity as it undergoes the formation process necessary to produce a beverage can end. It is a measure of the presence or absence of cracks or fractures in the formed end. The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 202 standard opening beverage can ends were exposed for a period of 4 seconds to a room-temperature electrolyte solution comprised of 1% NaCl by weight in deionized water. The coating to be evaluated was present on the interior surface of the beverage end at a dry film thickness of 6 to 7.5 milligrams per square inch ("msi") (or 9.3 to 11.6 grams per square meter), with 7 msi being the target thickness. Metal exposure was measured using a WACO Enamel Rater II, available from the Wilkens-Anderson Company, Chicago, Ill., with an output voltage of 6.3 volts. The measured electrical current, in milliamps, is reported. End continuities are typically tested initially and then after the ends are subjected to pasteurization or retort.

Preferred coatings of the present invention initially pass less than 10 mA when tested as described above, more preferably less than 5 mA, most preferably less than 2 mA, and optimally less than 1 mA. After pasteurization or retort, preferred coatings give continuities of less than 20 mA, more preferably less than 10 mA, even more preferably less than 5 mA, and even more preferably less than 2 mA.

EXAMPLES

The following examples are offered to aid in understanding of the present invention and are not to be construed as limiting the scope thereof. Unless otherwise indicated, all parts and percentages are by weight. Also, unless otherwise noted, the methods described in the Test Methodology section were utilized.

Example 1

Acrylic-Modified Polyurethane Dispersion

The following materials were charged to a two-liter flask equipped with an agitator, a thermocouple, a condenser, and a gas inlet port:

| | |
|---|---|
| PS-70L polyester diol (Stepan Company, Northfield, IL) | 159.15 grams |
| TERATHANE T-2000 polytetrahydrofuran (E. I. du Pont) | 53.04 grams |
| Dimethylol propionic acid | 42.67 grams |
| DESMODUR W diisocyanate (Bayer MaterialScience) | 151.36 grams |
| Methyl methacrylate | 155.49 grams |
| PROGLYDE DMM glycol ether (Dow Chemical) | 75.32 grams |
| Butylated hydroxy toluene | 0.64 grams |

These materials were then agitated with an air sparge and gently heated to 88° C. The reaction was held at 88° C. for approximately 3 hours to reach completion, which was determined by isocyanate titration. The material was then cooled to 60° C. and 32.16 grams of Triethylamine were added to the flask and mixed. After 5 to 10 minutes of mixing, the contents of the flask were slowly transferred to a second reaction vessel containing 1001.57 grams of deionized water and 75.32 grams of PROGLYDE DMM.

The second reaction vessel was equipped with an agitator, a thermocouple, a gas inlet port and a condenser. The contents of the second reaction vessel were agitated vigorously throughout the addition of the contents of the first reaction vessel. The initial temperature of the contents of the second reaction vessel was 9-12° C. The contents of the first reaction vessel were transferred to the second reaction vessel over the course of approximately 15 minutes.

Immediately following the completion of the transfer of polymer from the first reaction vessel to the second reaction vessel (i.e., the dispersion vessel), a premix of 33.0 grams deionized water and 7.22 grams ethylene diamine was added to the second reaction vessel. The resulting batch was agitated for 45 minutes after the addition and a mild exotherm of 3-5° C. was observed. After 45 minutes of elapsed time, 196.08 grams of n-butyl acrylate and 41.42 grams of glycidyl methacrylate were added with agitation. and a nitrogen blanket was applied to the reactor. The batch was agitated for 15 minutes and 1.33 grams of tert-butyl hydroperoxide (70% aq.) was added.

Immediately after this addition a feed of the following premix was started:

| | |
|---|---|
| Erythorbic Acid | 1.07 grams |
| Deionized Water | 40.0 grams |
| Triethylamine | 1.20 grams |
| 7% aqueous solution of DISSOLVINE E-FE-13 iron catalyst (Akzo Nobel) | 0.06 grams |

This premix was fed at an even rate over 30 minutes with an addition funnel. At approximately 10 to 15 minutes into the feed, an exotherm occurred. The batch was allowed to increase in temperature and the peak temperature attained was 50-60° C. After the feed of the premix was complete, the addition funnel was rinsed with 10.0 grams of deionized water. The batch was then cooled and poured.

Example 2

Coating Composition

Coating compositions 2A and 2B were prepared by combining the ingredients listed below in Table 1.

TABLE 1

| Ingredients | Example 2A (wt-%) | Example 2B (wt-%) |
|---|---|---|
| Ex. 1 Composition | 78.61 | 75.20 |
| Propylene Glycol | 11.78 | 11.27 |
| Deionized Water | 7.87 | 8.53 |
| Carnabua Emulsion | 1.74 | 1 |
| Phenolic Crosslinker | — | 3.33 |

Coating compositions 2A and 2B each had a theoretical total solids content of about 30 wt-%. The nonvolatile content of coating composition 2A was 98.8 wt-% of Example 1 solids and 1.2 wt-% of lubricant solids. The nonvolatile content of coating composition 2B was 93.42 wt-% of Example 1 solids, 5.48 wt-% phenolic crosslinker solids, and 1.1 wt-% lubricant solids.

Example 3

Coating Properties

The coating compositions of Examples 2A and 2B were each applied as a coil coating to Alcoa chrome metal coil. Steps were taken to improve flow and leveling prior to a 10-second dwell in an oven to achieve a 465° F. (241° C.) peak metal temperature and cure the coating.

The cured coating samples obtained in Example 2 for coating compositions 2A and 2B were tested for a variety of coating properties. The data for some of the coating property tests are included in Table 2 below.

TABLE 2

| Coating Composition | Example 2A | Example 2B |
|---|---|---|
| Film Weight (mg/in$^2$) | 6.9 | 6.7 |
| MEK Resistance | 2 | 7 |
| Feathering* | 0 | 0 |
| Water Pasteurization (90 minutes at 250° F. (121° C.)) | | |
| Blush (water/water vapor) | 8/10 | 8/10 |
| Adhesion (water/water vapor) | 10/10 | 10/10 |
| 202 Beverage Can Ends | | |
| Initial (prior to Dowfax) | 5.9 mA | 0.5 mA |
| After Dowfax | 13.6 mA | 0.9 mA |

*Feathering data is reported in inches. Pasteurization was conducted for 45 minutes at 185° F. (85° C.) prior to testing for feathering.

The complete disclosure of all patents, patent applications, and publications, and electronically available material cited herein are incorporated by reference. The foregoing detailed description and examples have been given for clarity of understanding only. No unnecessary limitations are to be understood therefrom.

The invention is not limited to the exact details shown and described, for variations obvious to one skilled in the art will be included within the invention defined by the claims. In some embodiments, the invention illustratively disclosed herein may be suitably practiced in the absence of any element (e.g., process step, ingredient, etc.) that is not specifically disclosed herein.

What is claimed is:

1. An article, comprising:

a food or beverage can, or a portion thereof, comprising:

a metal substrate; and a coating disposed on at least a portion of the metal substrate, wherein the coating is formed from an aqueous coating composition that includes a latex polymer comprising a water-dispersible polymer and a vinyl polymer that are linked together by one or more covalent linkages.

2. The article of claim 1, wherein the water-dispersible polymer comprises a water-dispersible acrylic polymer, a water-dispersible alkyd polymer, a water-dispersible polyester polymer, a water-dispersible polyurethane polymer, or a mixture or copolymer thereof.

3. The article of claim 1, wherein the vinyl polymer is formed by emulsion polymerizing an ethylenically unsaturated component in the presence of an aqueous dispersion of the water-dispersible polymer.

4. The article of claim 1, wherein the one or more covalent linkages is a step-growth linkage, a substituted or unsubstituted hydrocarbyl linkage, or a combination thereof.

5. The article of claim 1, wherein the one or more covalent linkages comprises a carbonate ester, epoxy, ether, imide, imine, urethane, or urea linkage, or a combination thereof.

6. The article of claim 1, wherein:

the water-dispersible polymer is present in an amount of at least 5 wt- %, based on the total weight of the vinyl polymer and the water-dispersible polymer; and the vinyl polymer is present in an amount of at least 15 weight percent, based on the total weight of the vinyl polymer and the water-dispersible polymer.

7. The article of claim 1, wherein at least 40 weight percent of the vinyl polymer comprises an alkyl acrylate, alkyl methacrylate, or a combination thereof, based on the total nonvolatile weight of ingredients used to make the vinyl polymer.

8. The article of claim 1, wherein the vinyl polymer has a number average molecular weight of at least 100,000.

9. The article of claim 1, wherein the coating composition is substantially free of bound bisphenol A and aromatic glycidyl ether compounds.

10. The article of claim 1, wherein the coating composition, when present on an aluminum beverage can end at a dry film thickness of 7 milligrams per square inch, passes less than 5 milliamps of current after being exposed for 4 seconds to a room -temperature electrolyte solution containing 1% by weight of NaCl dissolved in water.

11. The article of claim 1, wherein the coating composition is present on a food-contact surface of the metal substrate.

12. The article of claim 1, wherein the water-dispersible polymer comprises a polyurethane-urea polymer.

13. The article of claim 12, wherein the polyurethane-urea polymer includes one or more aliphatic carbon-carbon double bonds.

14. The article of claim 13, wherein the polyurethane-urea polymer includes one or more (poly)butadiene groups.

15. The article of claim 1, wherein the one or more covalent linkages comprises a condensation linkage.

16. The article of claim 15, wherein the one or more covalent linkages are hydrolytically stable.

17. A method, comprising:

providing a coating composition comprising an aqueous dispersion of a latex polymer, wherein the latex polymer includes a water-dispersible polymer and a vinyl polymer that are linked together by one or more covalent linkages; and forming a food or beverage can or a portion thereof from a metal substrate having the coating composition disposed on at least one surface.

18. The method of claim 17, wherein the coating composition comprises at least 10 weight percent of organic solvent and at least 20 weight percent of water.

19. The method of claim 17, wherein the latex polymer comprises at least 5 weight percent of the coating composition, based on the weight of latex polymer solids relative to the total weight of the coating composition.

20. A food or beverage can, or a portion thereof, produced by the method of claim 17.

21. A method, comprising:

providing a coating composition comprising an aqueous dispersion of a latex polymer, wherein the latex polymer includes a water-dispersible acrylic polymer and a vinyl polymer that are linked together by one or more hydrolytically stable covalent linkages, wherein the vinyl polymer is formed by emulsion polymerizing an ethylenically unsaturated component in the presence of an aqueous dispersion of the water-dispersible polymer; and forming a food or beverage can or a portion thereof from a metal substrate having the coating composition disposed on an interior surface.

22. The method of claim 21, wherein the coating composition contains less than 2 weight percent, if any, of vinyl chloride materials.

23. The method of claim 22, wherein the coating composition is substantially free of Bisphenol A and aromatic glycidyl ether compounds.

* * * * *